United States Patent
Yamasaki et al.

(10) Patent No.: US 8,477,584 B2
(45) Date of Patent: Jul. 2, 2013

(54) OPTICAL HEAD, OPTICAL DISC DRIVE, COMPUTER, OPTICAL DISCPLAYER AND OPTICAL DISC RECORDER

(75) Inventors: Fumitomo Yamasaki, Nara (JP); Yoshiaki Komma, Osaka (JP); Kanji Wakabayashi, Kyoto (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 12/015,688

(22) Filed: Jan. 17, 2008

(65) Prior Publication Data
US 2008/0175110 A1    Jul. 24, 2008

(30) Foreign Application Priority Data

Jan. 18, 2007 (JP) ................. 2007-009432

(51) Int. Cl.
*G11B 7/135* (2012.01)
(52) U.S. Cl.
USPC ..................................... 369/112.1
(58) Field of Classification Search
None
See application file for complete search history.

(56) References Cited

U.S. PATENT DOCUMENTS

| | | | |
|---|---|---|---|
| 5,377,177 A | 12/1994 | Horinouchi et al. | |
| 5,446,565 A | 8/1995 | Komma et al. | |
| 5,610,895 A * | 3/1997 | Izumi et al. | 369/44.24 |
| 6,014,360 A * | 1/2000 | Yonekubo et al. | 369/112.16 |
| 7,227,819 B2 | 6/2007 | Kadowaki et al. | |
| 8,238,220 B2 * | 8/2012 | Sato et al. | 369/112.23 |
| 2002/0027861 A1 * | 3/2002 | Tominaga et al. | 369/109.01 |

(Continued)

FOREIGN PATENT DOCUMENTS

| | | |
|---|---|---|
| JP | 06-290502 | 10/1994 |
| JP | 07-098431 | 4/1995 |

(Continued)

OTHER PUBLICATIONS

Notice of Final Rejection for corresponding Japanese Patent Application No. 2008-006542, issued on Dec. 6, 2011, with English language translation.

(Continued)

*Primary Examiner* — Joseph Haley
*Assistant Examiner* — Emily Frank
(74) *Attorney, Agent, or Firm* — Renner, Otto, Boisselle & Sklar, LLP

(57) ABSTRACT

When performing a read or write operation on an optical disc with information storage layers, this compatible optical head with a two-focus lens can reduce interference caused by an unnecessary diffracted light reflected from a non-target layer and not contributing to reading or writing. The head reads and/or writes information from/on storage media, including first and second media with different protective substrate thicknesses, by irradiating a given one with a laser beam and includes: a diffraction element that diffracts the beam to produce diffracted light of multiple orders; an objective lens for converging $n^{th}$ and $m^{th}$ order ones of the light on the respective storage layers of the first and second media; a photodetector that receives the beam reflected from the medium and condensed; and a light shielding portion for preventing a portion of the beam reflected from the storage layer of the second medium and including its optical axis from reaching the photodetector. The light shielding portion is arranged so as to reduce loss to be caused by cutting off the portion of the beam to a predetermined value or less.

16 Claims, 21 Drawing Sheets

U.S. PATENT DOCUMENTS

| | | | |
|---|---|---|---|
| 2003/0053393 A1* | 3/2003 | Shimano et al. | 369/112.02 |
| 2005/0083816 A1 | 4/2005 | Arai | |
| 2005/0161579 A1 | 7/2005 | Kim et al. | |
| 2007/0025205 A1* | 2/2007 | Kim et al. | 369/44.24 |
| 2007/0064573 A1* | 3/2007 | Nagata et al. | 369/112.1 |
| 2007/0274188 A1* | 11/2007 | Kikuchi | 369/112.01 |

FOREIGN PATENT DOCUMENTS

| | | |
|---|---|---|
| JP | 10-010308 | 1/1998 |
| JP | 2004-281026 A | 10/2004 |
| JP | 2005-063595 A | 3/2005 |
| JP | 2005-141893 | 6/2005 |
| JP | 2005-203090 | 7/2005 |

OTHER PUBLICATIONS

Notice of Final Rejection for corresponding Japanese Patent Application No. 2008-006542, issued on Dec. 6, 2011, with complete English language translation.

Blu-ray Disc Reader, Ohmsha, Ltd., Dec. 10, 2006, pp. 92, 171, 172, 222 to 225 and 240.

Notice of Reasons for Rejection for corresponding Japanese Patent Application No. 2008-006542, issued on Sep. 13, 2011, with English language translation.

Notice of Reasons for Rejection for corresponding Japanese Patent Application No. 2012-083793, issued on Apr. 16, 2013, with partial English language translation.

* cited by examiner

| APPROACH-ING / RETURNING | +FIRST-ORDER 15% | ZERO-ORDER 65% | -FIRST-ORDER 10% |
|---|---|---|---|
| +FIRST-ORDER 15% | SIGNAL BEAM S2 2.3% | STRAY LIGHT (1) 9.8% | STRAY LIGHT (3) 1.5% |
| ZERO-ORDER 65% | STRAY LIGHT (2) 9.8% | SIGNAL BEAM S1 42.3% | STRAY LIGHT (5) 6.5% |
| -FIRST-ORDER 10% | STRAY LIGHT (4) 1.5% | STRAY LIGHT (6) 6.5% | STRAY LIGHT (7) 1.0% |

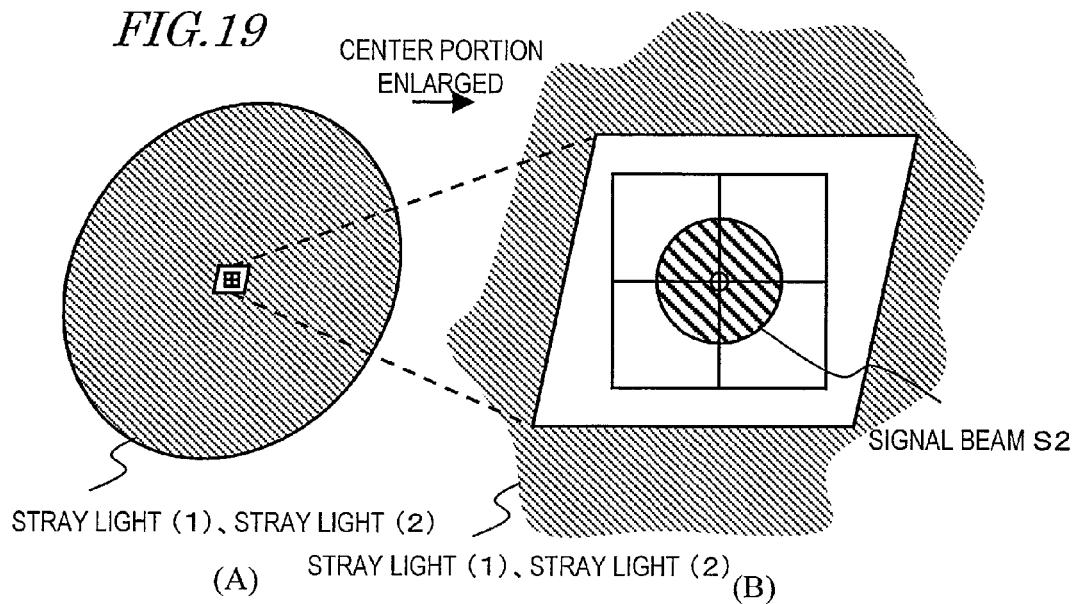
FIG.19 (A) STRAY LIGHT (1), STRAY LIGHT (2)
(B) STRAY LIGHT (1), STRAY LIGHT (2)
CENTER PORTION ENLARGED
SIGNAL BEAM S2
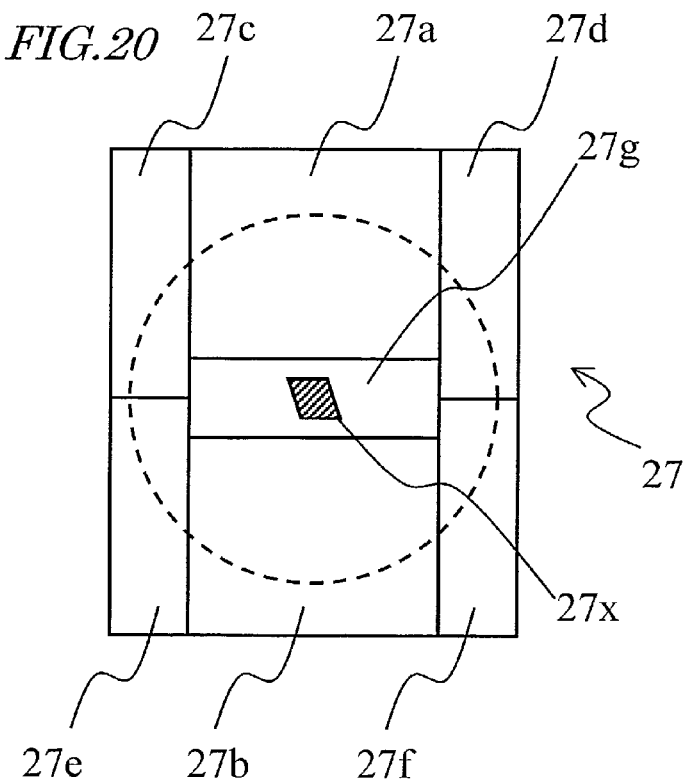
FIG.20

(A) STRAY LIGHT (1), STRAY LIGHT (2)

(B) STRAY LIGHT (1) STRAY LIGHT (2) — SIGNAL BEAM S2

CENTER PORTION ENLARGED

CONVENTIONAL ART

OPTICAL HEAD, OPTICAL DISC DRIVE, COMPUTER, OPTICAL DISCPLAYER AND OPTICAL DISC RECORDER

FIELD OF THE INVENTION

The present invention relates to an optical head for reading and/or writing information optically from/on multiple types of information storage media such as optical discs, an optical disc drive including such an optical head, and a computer, an optical disc player and an optical disc recorder equipped with such an optical disc drive.

DESCRIPTION OF THE RELATED ART

Recently, as blue-violet semiconductor lasers have been used more and more frequently, Blu-ray Discs (BDs) have become increasingly popular. BDs are optical information storage media (which will be referred to herein as "optical discs") that have the same size as, but have a higher density and a greater storage capacity than, CDs (Compact Discs) and DVDs (Digital Versatile Discs). Using a blue-violet laser light source with a wavelength of about 400 nm and an objective lens with a numerical aperture (NA) increased to 0.85 in combination, information can be read from, or written on, a BD, which is an optical disc with an information storage layer at a depth of approximately 0.1 mm as measured from one of its surfaces to transmit the incoming laser beam. In other words, a BD has a protective substrate with a thickness of approximately 0.1 mm.

Meanwhile, HD DVDs that use a blue-violet laser light source with a wavelength of approximately 400 nm and an NA of 0.65 in combination are also available to general public. HD DVDs have a protective substrate with a thickness of 0.6 mm.

To read and/or write information from/on those optical discs that have protective substrates with mutually different thicknesses by converging a laser beam on the information storage layer thereof using the same objective lens, optical heads with compatibility have been proposed.

For example, Japanese Patent Application Laid-Open Publications Nos. 7-98431 and 10-10308 disclose an optical head including a condensing optical system that can converge a laser beam on optical discs with different protective substrate thicknesses to the limit of diffraction.

FIG. 31 illustrates an exemplary arrangement for the conventional optical head disclosed in Japanese Patent Application Laid-Open Publication No. 7-98431. The conventional optical head 130 includes a light source 101 that emits a red laser beam, a beam splitter 103, a collimator lens 104, a hologram lens 105, an objective lens 106, a detector lens 108 and a photodetector 109.

Hereinafter, it will be described how this optical head 130 operates in reading or writing information from/on a DVD 70 having a protective substrate with a thickness of 0.6 mm. The red laser beam that has been emitted from the light source 101 is transmitted through the beam splitter 103, transformed into a substantially parallel beam by the collimator lens 104, transmitted through the hologram lens 105, and then converged by the objective lens 106 to form a light beam spot on the information storage layer of the DVD 70 through the protective substrate. On the way back, the red laser beam that has been reflected from the storage layer of the DVD 70 is transmitted through the objective lens 106, the hologram lens 105, and the collimator lens 104 along the same path as on the way toward the disc. Thereafter, the laser beam is reflected by the beam splitter 103, given a predetermined astigmatism by the detector lens 108, and then led to the photodetector 109, thereby generating an information signal and servo signals.

Next, it will be described with reference to FIG. 32 how this optical head 130 operates in reading or writing information from/on a CD 80, which is an optical disc having a protective substrate with a thickness of 1.2 mm. The red laser beam that has been emitted from the light source 101 is transmitted through the beam splitter 103, transformed into a substantially parallel beam by the collimator lens 104, diffracted by the hologram lens 105, and then converged by the objective lens 106 to form a light beam spot on the information storage layer of the CD 80 through the protective substrate. On the way back, the red laser beam that has been reflected from the information storage layer of the CD 80 is transmitted through the objective lens 106, the hologram lens 105, and the collimator lens 104 along the same path as on the way toward the disc. Thereafter, the laser beam is reflected by the beam splitter 103, given a predetermined astigmatism by the detector lens 108, and then led to the photodetector 109, thereby generating an information signal and servo signals.

A focus error signal for reading and/or writing information from/on the DVD 70 and the CD 70 may be generated by a so-called "astigmatism method", by which the light beam spot that has been given astigmatism by the detector lens 108 is detected as a quadruple light detection pattern by the photodetector 109. On the other hand, a tracking error signal may be generated by either a so-called "three-beam method" or a differential push-pull (DPP) method that use a main beam and sub-beams generated by a diffraction grating (not shown).

Next, the functions of the hologram lens 105 and the objective lens 106 will be described in detail with reference to FIGS. 33, 34A and 34B.

The hologram lens 105 has a grating pattern 105a such as that shown in FIG. 33. The hologram lens 105 diffracts +first-order diffracted light with an efficiency that is less than 100%, and is designed such that even transmitted light has sufficiently high intensity. It should be noted that non-diffracted transmitted light would also be referred to herein as "zero-order diffracted light". That is to say, the transmitted light would also be regarded herein as a type of diffracted light. Optionally, if the hologram lens 105 has a blaze configuration, then the sum of the zero-order diffracted light and the +first-order diffracted light can be increased and the optical efficiency can be improved.

The objective lens 106 has a numerical aperture (NA) of 0.6. As shown in FIG. 34A, the objective lens 106 is designed so as to form a light beam spot, which has been converged to the limit of diffraction, on the DVD 70 with a protective substrate thickness of 0.6 mm even when receiving a laser beam that has just been transmitted through, and has not been diffracted by, the hologram lens 105 (i.e., even when receiving zero-order diffracted light).

On the other hand, the +first-order diffracted light that has been diffracted by the hologram lens 105 is converged by the objective lens 106 on the CD 80 as shown in FIG. 34B. In this case, the aberration is corrected such that the +first-order diffracted light forms a light beam spot, which has been converged to the limit of diffraction, on the CD 80 with a protective substrate thickness of 1.2 mm.

As described above, by combining the hologram lens 105 that diffracts a portion of the incoming light with the objective lens 106, a two-focus lens that can form a light beam spot, which has been converged to the limit of diffraction, on optical discs with mutually different protective substrate thicknesses is realized.

As the hologram lens 105 has a lens function, the two focal points are located at mutually different positions along the optical axis. That is why while information is being read or written using the light beam spot that has been formed at one of the two focal points, the light beam spot that has been formed at the other focal point expands so much as to avoid affecting the operation of reading or writing the information.

Consequently, by using such an optical head 130, information can be read or written from/on multiple types of optical discs with the same objective lens.

Japanese Patent Application Laid-Open Publications Nos. 7-98431 and 10-10308 disclose a configuration for an optical head that is compatible with multiple types of optical discs with mutually different protective substrate thicknesses (such as DVDs and CDs) using such a two-focus lens with a hologram. These prior art documents, however, do not mention at all the influence of so-called "stray light", which is unnecessary diffracted light, not contributing to a read or write operation at all, that is reflected from a non-target information storage layer and incident on the photodetector while information is being read or written from/on a target one of multiple information storage layers of an optical disc.

On the other hand, Japanese Patent Application Laid-Open Publication No. 2005-203090 discloses an optical head that can suppress the interference caused by the stray light to be reflected from a non-target information storage layer and incident on the photodetector while information is being read or written from/on a target one of multiple information storage layers of an optical disc and that can detect a tracking error signal with higher accuracy.

FIG. 35 illustrates an exemplary arrangement for the conventional optical head disclosed in Japanese Patent Application Laid-Open Publication No. 2005-203090. This conventional optical head 230 includes a light source 201 that emits a blue-violet laser beam, a diffraction grating 202, a beam splitter 203, a collimator lens 204, an objective lens 206, an optical member 207, a detector lens 208 and a photodetector 209. The optical disc 90 is supposed to have a protective substrate with a thickness of about 0.1 mm and include multiple information storage layers.

Next, it will be described how this optical head 230 operates in reading or writing information from/on the optical disc 90. The blue-violet laser beam emitted from the light source 201 is split by the diffraction grating 202 into zero-order diffracted light and ±first-order diffracted light, which are transmitted through the beam splitter 203, transformed into a substantially parallel beam by the collimator lens 204, transmitted through the optical member 207, and then converged by the objective lens 206 to form a light beam spot on the information storage layer of the optical disc 90 through the protective substrate. On the way back, the blue-violet laser beam that has been reflected from the information storage layer of the optical disc 90 is transmitted through the objective lens 206, the optical member 207, and the collimator lens 204 along the same path as on the way toward the disc. Thereafter, the laser beam is reflected by the beam splitter 203, given a predetermined astigmatism by the detector lens 208, and then led to the photodetector 209, thereby generating an information signal and servo signals.

As shown in FIG. 36, the optical member 207 has diffraction areas 217 for partially diffracting the laser beam that has been reflected from a non-target information storage layer, thereby reducing the stray light entering the photodetector 209 and suppressing the interference. To prevent the information signal from deteriorating by partially cutting off the incoming light, the optical head further includes an auxiliary photodetector that detects the diffracted part of the laser beam.

The prior art documents described above, however, do not mention any configuration for suppressing the interference to be caused by the stray light that has been reflected from a non-target information storage layer of an optical disc or the surface of the disc and then incident on the photodetector in an optical head for reading and/or writing information with the laser beam converged by the same objective lens. For example, in the optical head that uses the two-focus lens, the quantity of diffracted light of a particular order could be significant compared to that of diffracted light of a predetermined order for use to read and/or write information, and therefore, interference between these two orders of the diffracted light should be reduced. From this point of view, the prior art documents, however, are silent about how and how much the interference should be reduced.

SUMMARY OF THE INVENTION

An object of the present invention is to minimize the deterioration of an information signal due to the cutoff of light and reduce the interference between a signal generated by a photodetector on receiving diffracted light of a predetermined order for reading and/or writing, which has been reflected from a target information storage layer, and another signal generated by the photodetector on receiving light that has been reflected from a non-target information storage layer, thereby detecting an information signal and servo signals with good stability.

An optical head according to a preferred embodiment of the present invention is designed to read and/or write information from/on multiple types of storage media, including a first storage medium and a second storage medium, by irradiating a given one of the storage media with a laser beam. The first and second storage media include a protective substrate with a thickness $t1$ and a protective substrate with a thickness $t2$ (where $t1 \neq t2$), respectively. The thicknesses $t1$ and $t2$ are the depth of the information storage layer of the storage media as measured from their surface irradiated with the laser beam. The optical head includes: a light source that emits the laser beam; a diffraction element that diffracts the laser beam to produce multiple orders of the diffracted light; an objective lens for converging, among the multiple orders of the diffracted light, an $n^{th}$ order (where n is an integer) diffracted light on the information storage layer of the first storage medium and an $m^{th}$ order (where m is an integer and $m \neq n$) diffracted light on the information storage layer of the second storage medium, respectively; a condenser lens for condensing the laser beam that has been reflected from the first or second storage medium; a photodetector that receives the condensed laser beam; and a light shielding portion for preventing a portion of the laser beam that has been reflected from the information storage layer of the second storage medium and that includes its optical axis from reaching the photodetector. The light shielding portion is arranged so as to reduce loss to be caused by cutting off the portion of the laser beam to a predetermined value or less.

The largest inside diameter of the light shielding portion may be less than 20% of the beam diameter of the laser beam that has been reflected from the information storage layer of the second storage medium.

The light shielding portion may be defined by providing, as a light shielding area, a film that has a transmittance of roughly 0% with respect to the laser beam for an optical member that transmits the laser beam that has been reflected from the information storage layer of the second storage medium.

The light shielding portion may be defined by providing, as a light shielding area, a film that has a reflectance of roughly 0% with respect to the laser beam for an optical member that further reflects the laser beam that has been reflected from the information storage layer of the second storage medium.

The film may be deposited on the optical member by an evaporation process.

The light shielding portion may be defined by providing, as a light shielding area, a diffraction member that has a diffraction efficiency of roughly 0% with respect to the zero-order diffracted light of the laser beam for an optical member that transmits or reflects the laser beam that has been reflected from the information storage layer of the second storage medium.

The light shielding portion may have a substantially circular or substantially parallelogram shape.

The light beam spot of the laser beam that has been formed on the photodetector after having been partially cut off by the light shielding portion may have substantially the same shape as the photodetector itself.

The optical member may be a beam splitter for use to generate a tracking error signal by splitting the laser beam that has been reflected from the first or second storage medium. The light shielding portion may be defined on the beam splitter.

The laser beam that has been incident on a predetermined area of the beam splitter, including the light shielding portion, does not have to be used to generate the tracking error signal.

The optical member may be a detector lens for use to generate a focus error signal by giving astigmatism to the laser beam that has been reflected from the first or second storage medium. The light shielding portion may be defined on the detector lens.

The light shielding portion may be arranged along an optical path of the laser beam that has been reflected from the information storage layer of the second storage medium and is yet to reach the photodetector so as to be located off an optical path leading from the light source to the second storage medium.

The light shielding portion may be arranged away from the photodetector.

An optical head according to another preferred embodiment of the present invention is designed to read and/or write information from/on one of at least three information storage layers of a storage medium by irradiating the storage medium with a laser beam. The optical head includes: a light source that emits the laser beam; an objective lens that converges the laser beam on one of the information storage layers of the storage medium; a condenser lens for condensing the laser beam that has been reflected from the information storage layer of the storage medium; a photodetector that receives the condensed laser beam; and a light shielding portion for preventing a portion of the laser beam that has been reflected from the at least three information storage layers and that includes its optical axis from reaching the photodetector. The light shielding portion is arranged so as to reduce the loss of the reflected light to be caused by cutting off the portion of the laser beam to a predetermined value or less.

An optical disc drive according to a preferred embodiment of the present invention includes a motor for rotating and driving an optical head and an information storage medium, and a control section for controlling the optical head and the motor. An optical head according to any of the preferred embodiments of the present invention described above is used as the optical head.

A computer according to a preferred embodiment of the present invention includes: the optical disc drive just described; an input section for entering information; a computing section for making calculations based on the information that has been read by the optical disc drive and/or the information that has been entered through the input section; and an output section for outputting at least one of the information that has been read by the optical disc drive, the information that has been entered through the input section, and results of the calculations made by the computing section.

An optical disc player according to a preferred embodiment of the present invention includes the optical disc drive described above, and a decoder for converting an information signal, supplied from the optical disc drive, into image information.

An optical disc recorder according to a preferred embodiment of the present invention includes the optical disc drive described above, and an encoder for converting image information into an information signal to be written by the optical disc drive.

The present invention can reduce the interference between a signal generated by a photodetector on receiving diffracted light of a predetermined order that will be used for reading and/or writing and that has been reflected from a target information storage layer or the surface of an optical disc and another signal generated by the photodetector on receiving diffracted light of a different order that does not contribute to reading or writing and that has been reflected from a non-target information storage layer. As a result, an information signal and servo signals can be generated with good stability. Since read and/or write operation(s) can be performed just as intended on multiple types of optical discs, a device according to the present invention will achieve increased reliability.

BRIEF DESCRIPTION OF THE DRAWINGS

FIG. 19 schematically illustrates how a light beam spot is formed on the photodetector in a rectangular light shielding area while information is being read from the second optical disc.

FIG. 20 illustrates the shape of still another light shielding area on a detector hologram.

DETAILED DESCRIPTION OF PREFERRED EMBODIMENTS

Hereinafter, preferred embodiments of an optical head, an optical disc drive, a computer, an optical disc player, and an optical disc recorder according to the present invention will be described with reference to the accompanying drawings.

Embodiment 1

Figure 1:
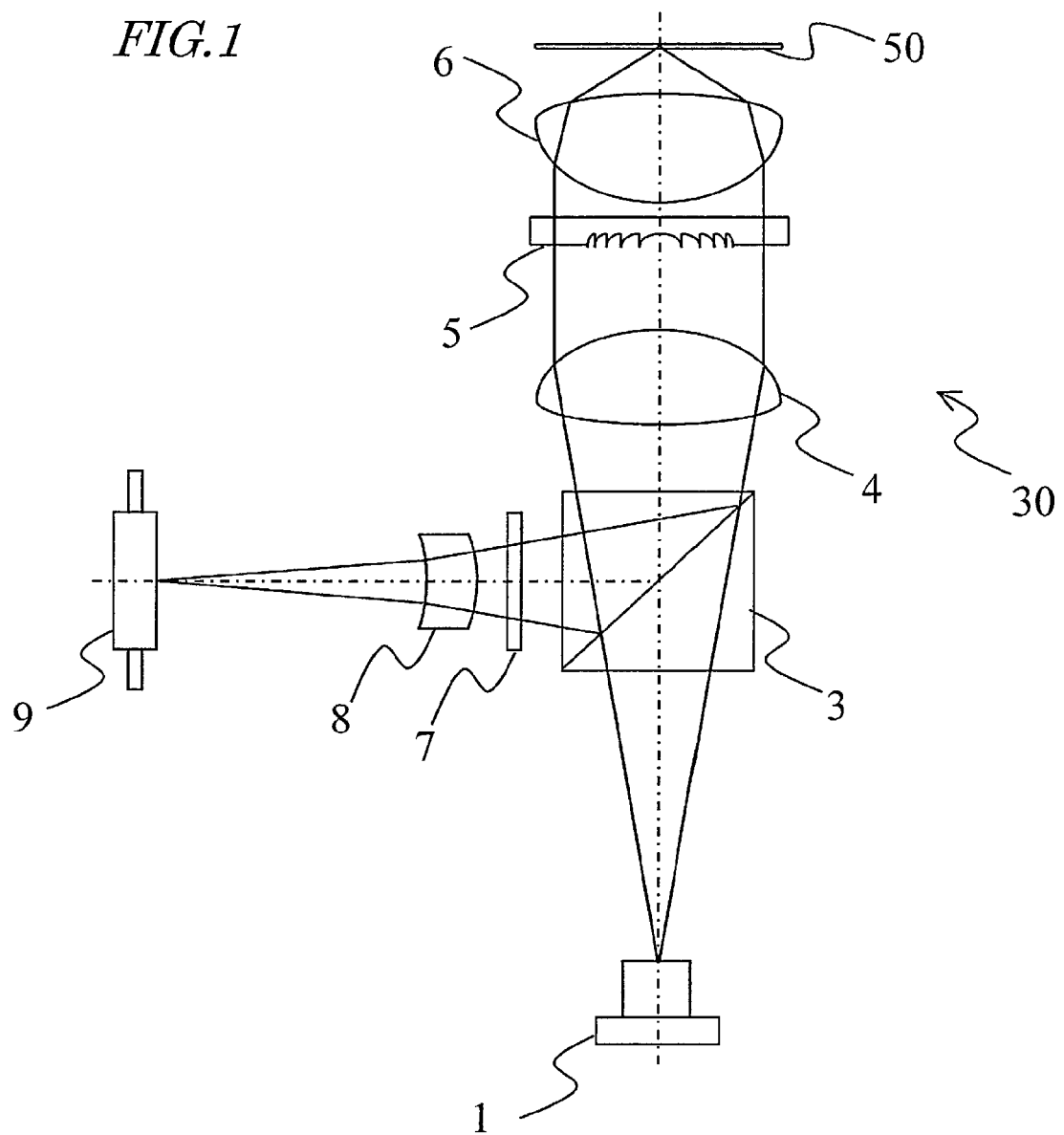
FIG. 1 illustrates a general arrangement for an optical head as a first preferred embodiment of the present invention that is performing read or write operation on a first optical disc 50.
Figure 2:
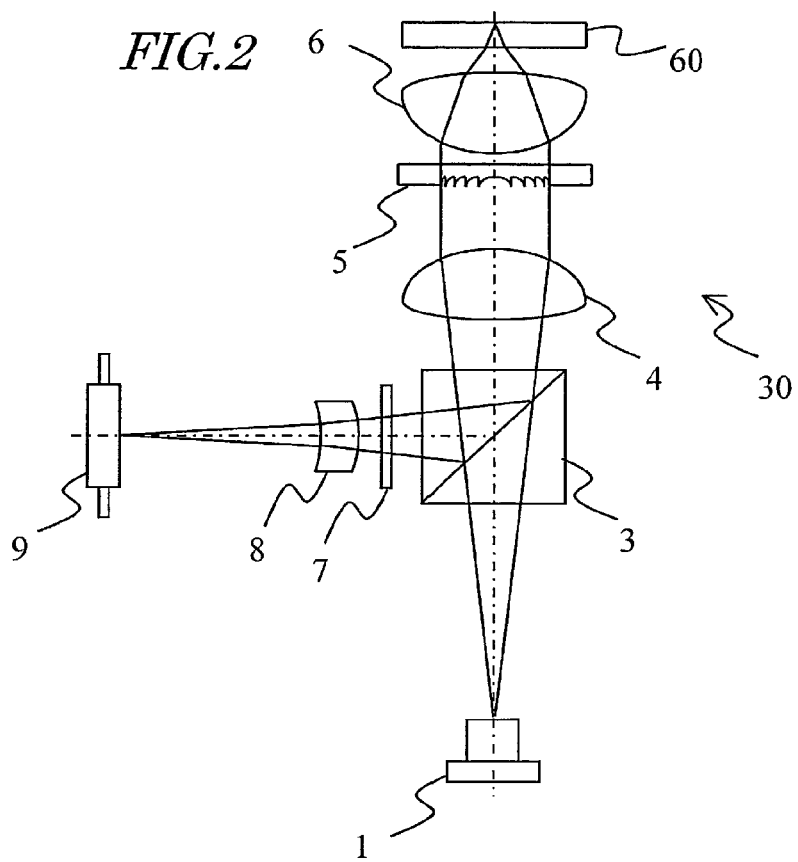
FIG. 2 illustrates a general arrangement for the optical head as the first preferred embodiment of the present invention that is performing a read operation on a second optical disc 60.

FIGS. 1 and 2 illustrate a general arrangement for an optical head 30 as a first preferred embodiment of the present invention. FIGS. 1 and 2 illustrate the arrangement of the same optical head 30. The Difference Between these two drawings lies in that FIG. 1 illustrates a state where a first optical disc 50 is being irradiated with a laser beam, while FIG. 2 illustrates a state where a second optical disc 60 is being irradiated with a laser beam. The first optical disc 50 has a protective substrate with a thickness of about 0.1 mm and the second optical disc 60 has a protective substrate with a thickness of about 0.6 mm.

In the following description of preferred embodiments, the "protective substrate" will refer to a layer that is arranged so as to cover an information storage layer. A laser beam for reading and writing information reaches the information storage layer through the protective substrate. The thickness of the protective substrate will also be referred to herein as the "depth of the information storage layer" as measured from the surface on which the laser beam is incident.

As shown in FIGS. 1 and 2, the optical head 30 includes a light source 1 that emits a blue-violet laser beam, a beam splitter 3, a collimator lens 4, a hologram lens 5, an objective lens 6, a detector hologram 7, a detector lens 8, and a photodetector 9 to receive the laser beam.

The optical head 30 of this preferred embodiment reads and writes information from/on the first optical disc 50 but just reads information from the second optical disc 60. However, the present invention is in no way limited to this specific preferred embodiment of an optical head. Alternatively, the present invention is also applicable to an optical head that can write information on the second optical disc 60, too. Still alternatively, the present invention is also applicable to an optical head that reads and writes information from/on the second optical disc 60 but only reads information from the first optical disc 50.

Hereinafter, it will be described with reference to FIG. 1 how the optical head 30 operates in reading or writing information from/on the first optical disc 50. The blue-violet laser beam that has been emitted from the light source 1 is transmitted through the beam splitter 3, transformed into a substantially parallel beam by the collimator lens 4, transmitted through the hologram lens 5, and then converged by the objective lens 6 to form a light beam spot on the information storage layer of the optical disc 50 through the protective substrate. On the way back, the blue-violet laser beam that has been reflected from the information storage layer of the first optical disc 50 is transmitted through the objective lens 6, the hologram lens 5, and the collimator lens 4 along the same optical path as on the way toward the disc. Thereafter, the blue-violet laser beam is reflected by the beam splitter 3, split by the detector hologram 7 to generate servo signals, given a predetermined astigmatism by the detector lens 8, and then led to the photodetector 9, thereby generating an information signal and the servo signals.

Next, it will be described with reference to FIG. 2 how the optical head 30 operates in reading information from the second optical disc 60. The blue-violet laser beam that has been emitted from the light source 1 is transmitted through the beam splitter 3, transformed into a substantially parallel beam by the collimator lens 4, diffracted by the hologram lens 5, and then converged by the objective lens 6 to form a light beam spot on the information storage layer of the second optical disc 60 through the protective substrate. On the way back, the blue-violet laser beam that has been reflected from the information storage layer of the second optical disc 60 is transmitted through the objective lens 6, the hologram lens 5, and the collimator lens 4 along the same optical path as on the way toward the disc. Thereafter, the blue-violet laser beam on the way back is reflected by the beam splitter 3, transmitted through the detector hologram 7, given a predetermined astigmatism by the detector lens 8, and then led to the photodetector 9, thereby generating an information signal and servo signals.

The focus error signals for the first and second optical discs 50 and 60 are generated by a so-called "astigmatism" method in which the light beam spot that has been given astigmatism by the detector lens 8 is detected as a quadruple light detection pattern by the photodetector 9.

Also, the tracking error signal for the first optical disc 50 is generated based on the +first-order diffracted light that have been produced by the detector hologram 7. On the other hand, the tracking error signal for the second optical disc 60 is generated by a so-called "differential phase detection" method in which the zero-order diffracted light that has been transmitted through the detector hologram 7 is detected as a quadruple light detection pattern in the photodetector 9.

Figure 3:
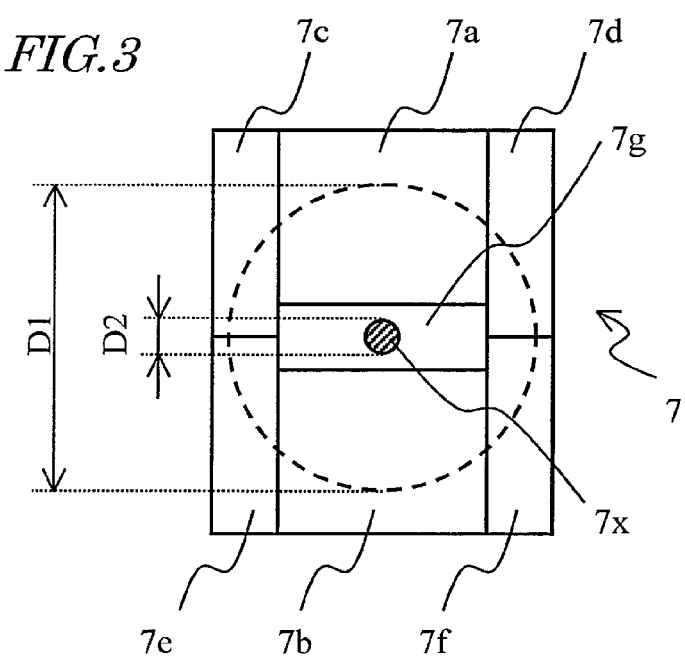
FIG. 3 schematically illustrates a beam splitting pattern and a light shielding area for a detector hologram 7.

FIG. 3 schematically illustrates a beam splitting pattern on the detector hologram 7.

The detector hologram 7 has seven transmitting areas 7a through 7g and splits the incoming laser beam into zero-order diffracted light and ±first-order diffracted light. Referring to the diffracted light x0 and xa through xg shown in FIG. 4, it can be seen that the zero-order diffracted light x0 is produced by the areas 7a through 7g. The +first-order diffracted light xa is produced by the area 7a. In the same way, the +first-order diffracted light xb, xc, xd, xe, xf and xg are produced by the areas 7b, 7c, 7d, 7e, 7f and 7g, respectively.

It should be noted that the detector hologram 7 also has a light shielding area 7x to partially cut off the incoming laser beam. The light shielding area 7x will be described later.

Figure 4:
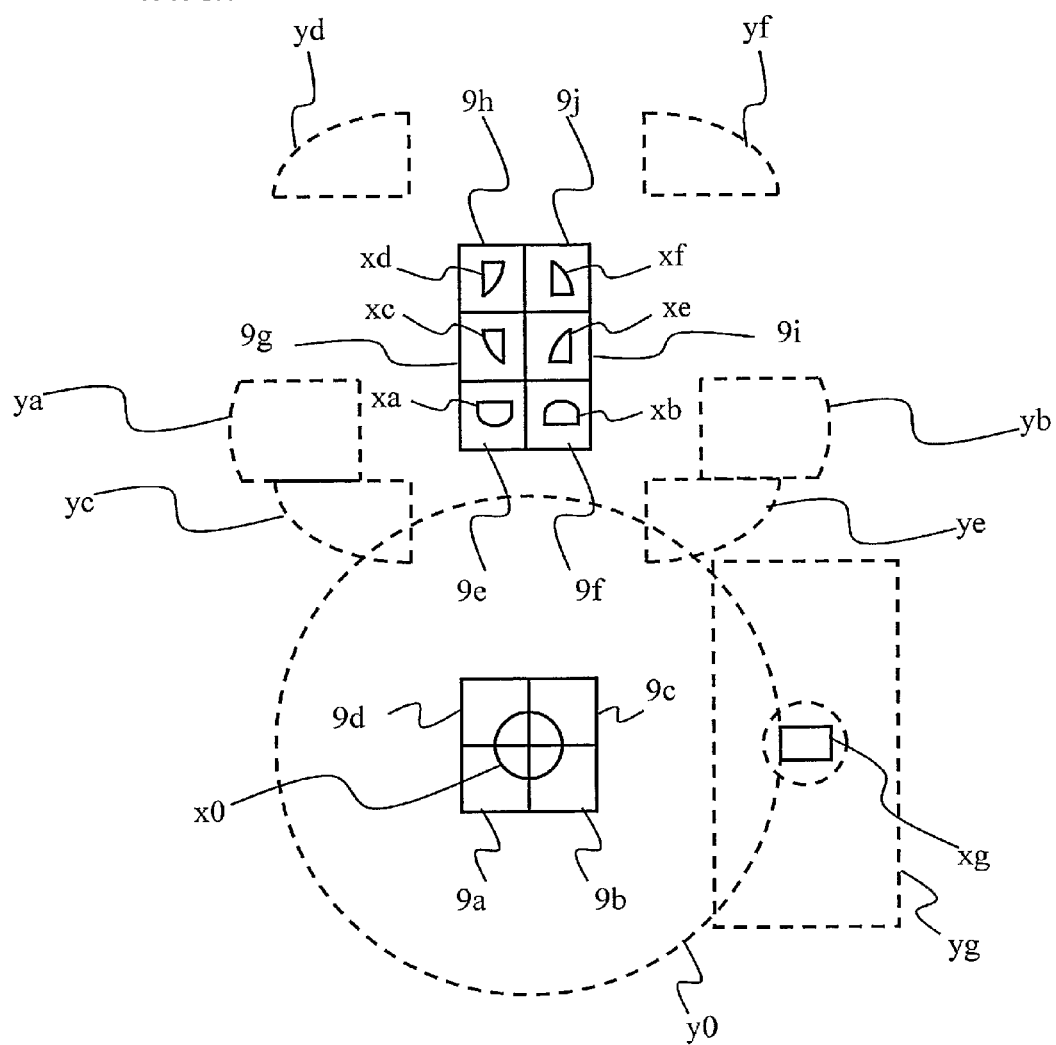
FIG. 4 schematically illustrates patterns on the photodetection areas of a photodetector 9.

FIG. 4 schematically illustrates patterns on the photodetection areas of the photodetector 9 and also shows what patterns the laser beam reflected from the optical disc forms on the photodetector 9, which has ten photodetection areas 9a through 9j in total.

The photodetection areas 9a through 9d are used to generate not only a focus error signal for the first and second optical discs 50 and 60 but also a signal to read the information stored on the optical disc. Also, the photodetection areas 9a through 9d are used to generate a tracking error signal for the second optical disc 60 by the phase difference method. On the other hand, the photodetection areas 9e through 9j are used to generate a tracking error signal for the first optical disc 50.

By defining the photodetection areas 9a through 9d for generating the focus error signals and the photodetection areas 9e through 9j for generating the tracking error signals on the same semiconductor substrate, the overall size of the optical head can be reduced and the number of process steps to assemble the optical head can be decreased.

The photodetection areas 9a through 9j output current signals I9a through I9j representing the respective intensities of light received there. The focus error signal FE is calculated by:

$$FE=(I9a+I9c)-(I9b+I9d)$$

On the other hand, the tracking error signal TE is calculated by:

$$TE=(I9e-I9f)-k(I9g+I9h-I8i-I9j)$$

In this case, the zero-order diffracted light x0 is received at the four photodetection areas 9a through 9d. Meanwhile, the +first-order diffracted light xa, xb, xc, xd, xe and xf are received at the photodetection areas 9e, 9f, 9g, 9h, 9i and 9j, respectively.

The zero-order diffracted light x0 and the +first-order diffracted light xa through xg are produced when the laser beam that has been reflected from the information storage layer of the optical disc is incident on the detector hologram 7. Suppose the first optical disc 50 has two information storage layers (not shown), which will be identified herein by the reference numerals 50a and 50b, respectively, for convenience sake. If the target information storage layer to read information from, or write information on is the information storage layer 50a, the beam that has been reflected from the other information storage layer 50b also enters the detector hologram 7. As a result, the zero-order diffracted light and the +first-order diffracted light are produced.

Meanwhile, a zero-order diffracted light y0 and +first-order diffracted light ya through yg are produced when the laser beam that has been reflected from the non-target information storage layer 50b, other than the target information storage layer 50a to read information from, or write information on, enters the detector hologram 7. The zero-order diffracted light y0 is produced by the areas 7a through 7g shown in FIG. 3. On the other hand, the +first-order diffracted light ya, yb, yc, yd, ye, yf and yg are produced by the areas 7a, 7b, 7c, 7d, 7e, 7f and 7g, respectively.

When the laser beam converged by the objective lens 6 is focused on the information storage layer 50a, the same laser beam is significantly defocused on (i.e., out of focus with) the other information storage layer 50b. That is why the zero-order diffracted light y0 and the +first-order diffracted light ya through yg are also significantly defocused on the photodetector 9.

The optical head 30 of this preferred embodiment is designed such that none of the zero-order diffracted light y0 and the +first-order diffracted light ya through yg enter the photodetection areas 9e through 9j. By adopting such an arrangement, neither the zero-order diffracted light y0 nor the +first-order diffracted light ya through yg will enter the photodetection areas 9e through 9j to cause a variation in tracking error signal. As a result, it is possible to prevent the tracking control from losing its stability.

It should be noted that the +first-order diffracted light xg produced by the center area 7g of the detector hologram 7 shown in FIG. 3 is diffracted perpendicularly to the other +first-order diffracted light xa through xf so as not to be received by any photodetection area. As a result, it is possible to reduce the variation in the tracking error signal that would be caused if grooves on the optical disc change their locations, widths or depths or when information is written on the tracks. It is also possible to prevent unnecessary light from entering an area of the photodetector that is being used to generate the tracking error signal in a situation where the given optical disc has a number of information storage layers.

The −first-order diffracted light, which are produced at conjugate positions with respect to the +first-order diffracted light, never enter the photodetection areas 9a through 9j, either.

Next, it will be described in detail with reference to FIGS. 5, 6, 7A and 7B how the hologram lens 5 and the objective lens 6 work.

Figure 5:
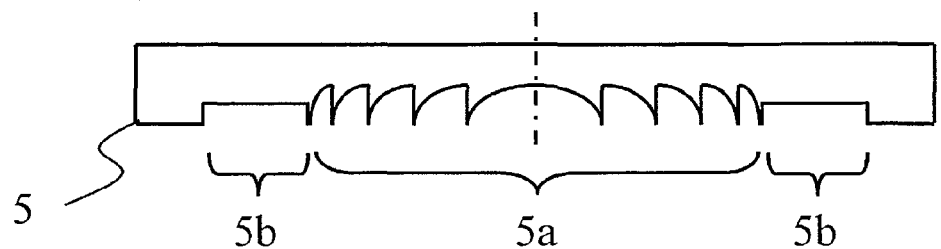
FIG. 5 schematically illustrates the configuration of a hologram lens 5.

As shown in FIG. 5, the hologram lens 5 has a concentric grating pattern 5a, of which the center (i.e., the optical axis) agrees with that of the objective lens 6 within an assembling error. Also, the grating pattern of the hologram lens 5 is located only within a diameter that is smaller than the aperture d by the objective lens 6. That is why no diffraction occurs at all where the grating pattern 5a of the hologram lens 5 is not present.

It should be noted that the phase of the zero-order diffracted light transmitted through the grating pattern 5a becomes the average of the magnitudes of phase modulations produced by the grating pattern 5a. The convergence performance is preferably improved by substantially matching the phase of the light transmitted through the area 5b without the grating pattern 5a to that of the zero-order diffracted light transmitted through the grating pattern 5a. For example, if the grating pattern 5a of the hologram lens 5 has a relief shape, the surface of that area 5b without the grating pattern is preferably roughly leveled with the average level of the unevenness of the grating pattern 5a as shown in FIG. 5.

The hologram lens 5 is designed so as to exhibit a diffraction efficiency of less than 100% with respect to a +first-order diffracted light and to allow even a transmitted light (i.e., zero-order diffracted light) to have a sufficiently high intensity. If the hologram lens 5 has a blaze shape, then the sum of the quantities of the zero- and first-order diffracted light can be increased and the optical efficiency can be improved.

The optical head 30 of this preferred embodiment performs read and write operations on the first optical disc 50 but performs only a read operation on the second optical disc 60. When used for such an optical head, the hologram lens 5 preferably exhibits a diffraction efficiency of 30% or less with respect to the +first-order diffracted light. By setting the diffraction efficiency to such a value, the transmittance of the hologram lens 5 (i.e., the diffraction efficiency of the zero-order diffracted light) can be increased. As a result, higher optical efficiency is achieved on the first optical disc 50 to write information on, and the optical power of the light source can be lowered during the write operation.

On the other hand, when used for an optical head that performs only a read operation on both of the first and second optical discs 50 and 60, the hologram lens 5 preferably exhibits a diffraction efficiency of approximately 30-70% with respect to the +first-order diffracted light. By setting the diffraction efficiency to such a value, information can be read from the first and second optical discs 50 and 60 using approximately equal quantities of light. As a result, the optical power of the light source can be lowered.

Figure 6:
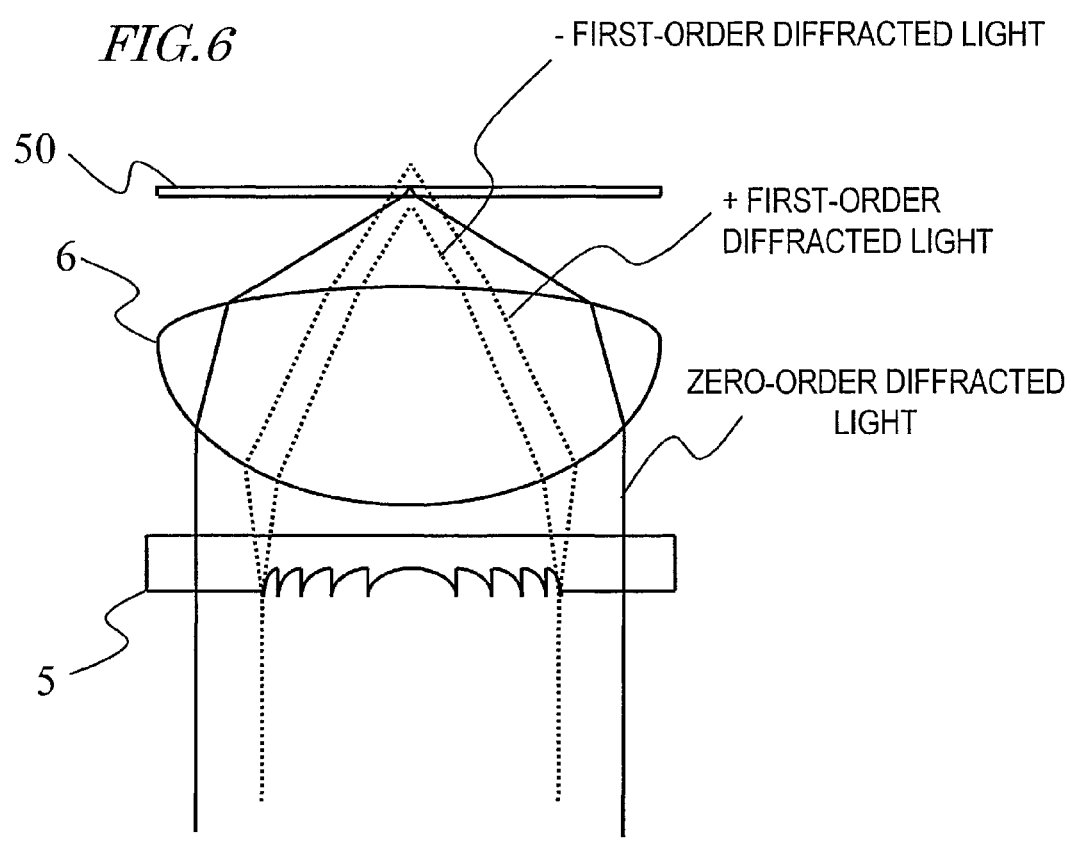
FIG. 6 schematically illustrates where +first-order diffracted light, zero-order diffracted light, and −first-order diffracted light are produced in the first preferred embodiment while a read or write operation is being performed on the first optical disc 50.

If the hologram lens 5 has such a grating pattern as to produce desired +first-order diffracted light, then not only the zero-order diffracted light and the +first-order diffracted light but also −first-order diffracted light, which are conjugate with respect to the +first-order diffracted light, and other higher-order diffracted light are produced as shown in FIG. 6. For example, the hologram lens 5 of this preferred embodiment exhibits a diffraction efficiency (i.e., transmission efficiency) of approximately 65% with respect to the zero-order diffracted light, a diffraction efficiency of approximately 15% with respect to the +first-order diffracted light and a diffraction efficiency of approximately 10% with respect to the −first-order diffracted light.

Figure 7A:
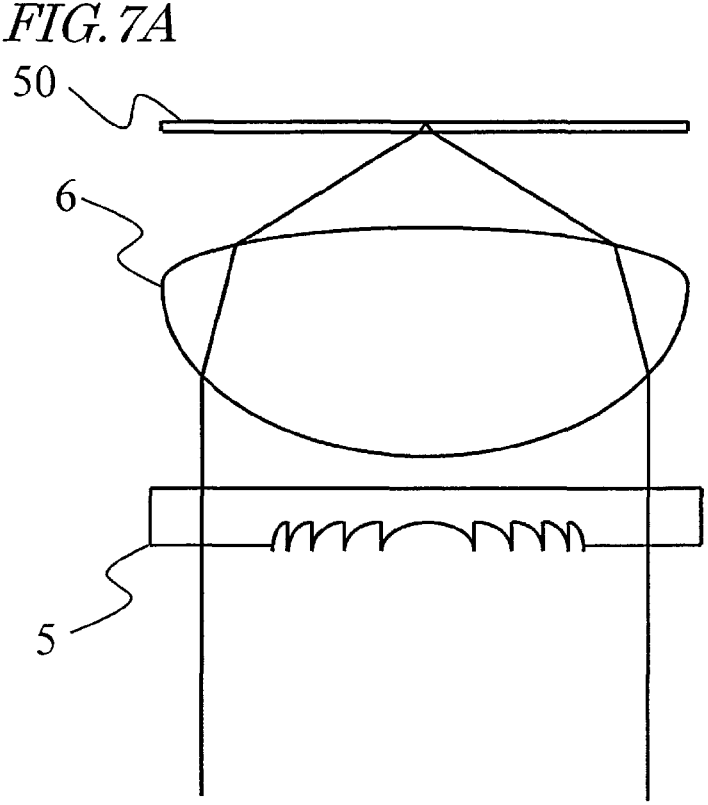
FIG. 7A shows how the hologram lens 5 and an objective lens work on the first optical disc 50.

The objective lens 6 has a numerical aperture (NA) of 0.85. As shown in FIG. 7A, the objective lens 6 is designed so as to form a light beam spot, which has been converged to the limit of diffraction, on the information storage layer of the first optical disc 50 with a protective substrate thickness of approximately 0.1 mm when the laser beam that has been just transmitted through the hologram lens 5 without being diffracted (i.e., the zero-order diffracted light) is incident on the objective lens 6.

Figure 7B:
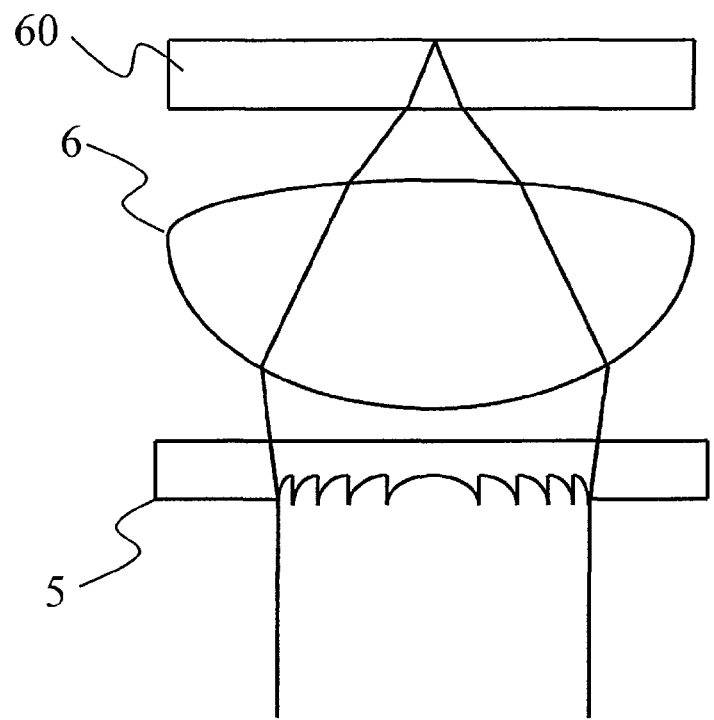
FIG. 7B shows how the hologram lens 5 and an objective lens work on the second optical disc 60.

On the other hand, the +first-order diffracted light that has been diffracted by the hologram lens 5 is converged by the objective lens 6 on the second optical disc 60 as shown in FIG. 7B. In this case, the +first-order diffracted light has been subjected to aberration correction so as to form a light beam spot, which has been converged to the limit of diffraction, on the information storage layer of the second optical disc 60 with a protective substrate thickness of approximately 0.6 mm.

By using such a hologram lens 5 that diffracts a portion of the incoming light and the objective lens 6 in combination, a two-focus lens that can form a light beam spot, which has been converged to the limit of diffraction, on the information storage layer of multiple optical discs with mutually different protective substrate thicknesses is realized.

The hologram lens 5 of this preferred embodiment has the function of giving more convex lens power to a +first-order diffracted light than to a zero-order diffracted light. That is why the focal point of the +first-order diffracted light with respect to the objective lens 6 becomes more distant than that of the zero-order diffracted light. Consequently, when the +first-order diffracted light needs to be converged on the information storage layer of the second optical disc 60, which has a thicker protective substrate than the first optical disc 50, a sufficient working distance (WD) can be maintained between the second optical disc 60 and the objective lens 6.

The hologram lens 5 functions as a convex lens with respect to the +first-order diffracted light. For that reason, the focal point of the zero-order diffracted light to read or write information from/on the first optical disc 50 and that of the +first-order diffracted light to read information from the second optical disc 60 are located at different positions along the optical axis. That is why while information is being read or written using the light beam spot that has been formed at one of these two focal points, the light beam spot formed at the other focal point is defocused and expanded significantly on the information storage layer.

Figures 8, 9:
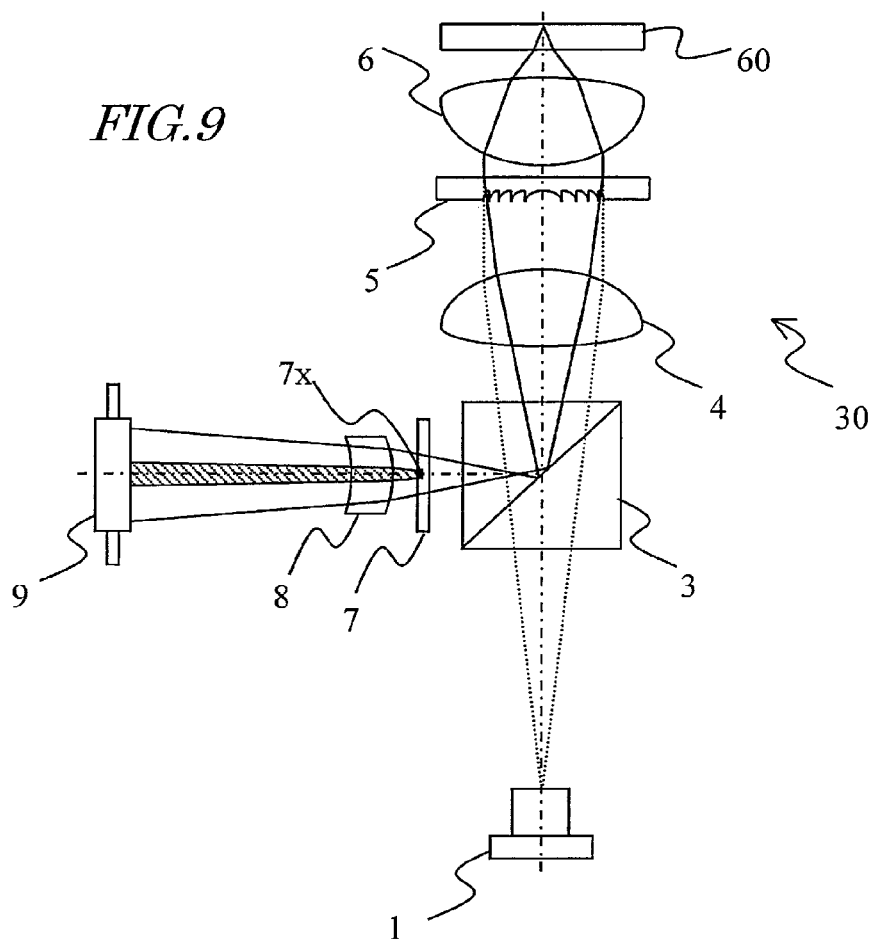
FIG. 8 shows correlations between the diffraction efficiencies of the hologram lens 5 and an objective lens 16 with hologram, the percentages of an optical signal, and the percentages of stray light.
FIG. 9 schematically illustrates the optical path of stray light in the first preferred embodiment while information is being read from the second optical disc 60.

In this preferred embodiment, it is the light beam spot of the signal beam S1 shown in FIG. 8 that is used to perform read/write operations on the first optical disc 50. The signal beam S1 is the light detected when the laser beam that has been transmitted through the hologram lens 5 on the way toward the disc (i.e., the zero-order diffracted light) and then reflected from the information storage layer is transmitted through the hologram lens 5 again on the way back. That is to say, the signal beam S1 is a zero-order diffracted light on the way back from the disc.

On the other hand, it is the light beam spot of the signal beam S2 shown in FIG. 8 that is used to perform a read operation on the second optical disc 60. The signal beam S2 is the light detected when the laser beam that has been diffracted by the hologram lens 5 on the way toward the disc (i.e., +first-order diffracted light) and then reflected from the information storage layer is diffracted by the hologram lens 5 again on the way back. That is to say, the signal beam S2 is a +first-order diffracted light on the way back from the disc.

As for the other light beam spots (i.e., stray light) to be detected on the photodetector, however, there are as many as the following seven different stray light patterns (1) through (7) even if only combinations of the zero-order diffracted light and +first-order diffracted light are taken into consideration:

Stray light pattern (1): a combination of a zero-order diffracted light transmitted on the way toward the disc and a +first-order diffracted light diffracted on the way back;

Stray light pattern (2): a combination of a +first-order diffracted light diffracted on the way toward the disc and a zero-order diffracted light transmitted on the way back;

Stray light pattern (3): a combination of a −first-order diffracted light diffracted on the way toward the disc and a +first-order diffracted light diffracted on the way back;

Stray light pattern (4): a combination of a +first-order diffracted light diffracted on the way toward the disc and a −first-order diffracted light diffracted on the way back;

Stray light pattern (5): a combination of a −first-order diffracted light diffracted on the way toward the disc and a zero-order diffracted light transmitted on the way back;

Stray light pattern (6): a combination of a zero-order diffracted light transmitted on the way toward the disc and a −first-order diffracted light diffracted on the way back; and Stray light pattern (7): a combination of a −first-order diffracted light diffracted on the way toward the disc and a −first-order diffracted light diffracted on the way back.

In FIG. 8, the numerals under the signal beam and the stray light indicate a combined efficiency on the way toward and back from the disc. In the signal beam S1 used to perform read/write operations on the first optical disc 50, the quantity of light actually contributing to getting the read/write operation done includes the quantity of light that has been transmitted through an area without the grating pattern. However, none of the efficiencies shown in FIG. 8 includes the quantity of light that has been transmitted through that area without the grating pattern.

In this case, in reading information from the second optical disc 60, the light beam spot formed by the stray light on the photodetector is defocused. However, as shown in FIG. 8, the quantities of light of the signal beam S1 (which becomes stray light when a read/write operation is performed on the second optical disc 60) and the stray light (1), (2), (5) and (6) are much greater than that of the signal beam S2 used to read information from the second optical disc 60. That is why the influence of the interference between the signal beam S2 and the stray light is non-negligible.

As for the interference between the signal beam and the stray light, as the relative optical path length varies, the interference changes its states and the intensity of the signal beam detected also varies, which is a problem. For that reason, as the distance between multiple information storage layers of a multilayer optical disc varies or as the distance from an information storage layer to the surface of the optical disc varies, the interference between the signal beam S2 reflected from a particular information storage layer and stray light reflected from another information storage layer or from the surface of the optical disc changes its states, thus varying the intensity of the signal beam S2 detected. This is a non-negligible problem in order to stabilize the servo signals and the information signal.

It should be noted that in performing a read or write operation on the first optical disc 50, the quantities of stray light are smaller than that of the signal beam S1 used to perform the read or write operation on the first optical disc 50. That is why the influence of the interference is negligible.

To avoid the interference between the signal beam S2 and the stray light, the detector hologram 7 of this preferred embodiment includes the light shielding area 7x shown in FIG. 3. The light shielding area 7x is a circular area with a diameter D2, which is approximately 10% of the diameter D1 of the light beam used to perform a read/write operation on the first optical disc 50 as indicated by the dashed circle. The light shielding area 7x is defined by depositing a metallic film of aluminum, chromium, graphite, titanium, gold or silver or a dielectric film by an evaporation process and has a transmittance of roughly 0%. The transmittance is preferably substantially equal to zero. But substantially the same effects are achieved even if the transmittance is several percents (e.g., 10%). A transmittance of 10% or less will be referred to herein as a "transmittance of roughly 0%".

FIG. 9 schematically illustrates the optical paths of laser beams as the stray light (1) and (2) (which substantially superpose one upon the other at the photodetector 9 after having followed almost the same optical paths) while information is being read from the second optical disc 60 using the optical head 30. As described above, in an optical disc with multiple information storage layers, the interference between signal beams reflected from mutually different information storage layers and stray light will raise a problem. The optical paths of the laser beams as the stray light shown in FIG. 9 go back from a different information storage layer from that of the optical path of the laser beam representing the signal beam shown in FIG. 2.

The laser beam reflected from a non-target information storage layer of the second optical disc 60 passes through the objective lens 6, the hologram lens 5 and the collimator lens 4. Since the zero-order diffracted light is subjected to a great convex lens effect by the hologram lens 5, the stray light (1) and (2) are condensed before reaching the photodetector 9. For example, in the optical head 30 of this preferred embodiment, the stray light (1) and (2) are once condensed in the beam splitter 3 and then pass through the detector hologram 7 as diverged light. At this point in time, the center portion of the laser beam is cut off by the light shielding area 7x of the detector hologram 7 and then the laser beam is transmitted through the detector lens 8 and led to the photodetector 9.

Figure 10:
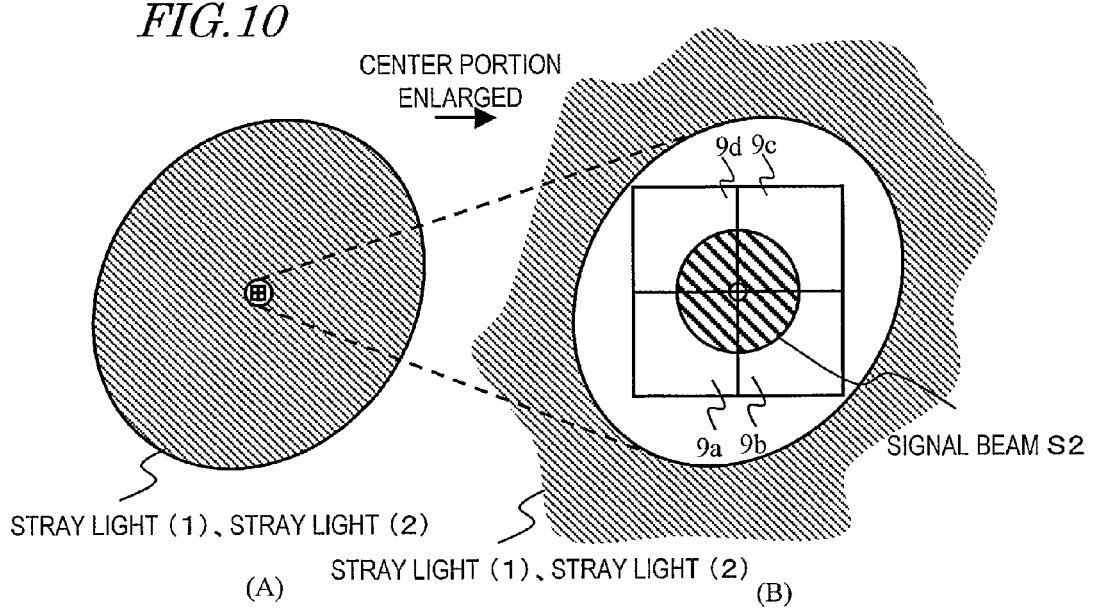
FIG. 10 schematically illustrates how a light beam spot is formed on the photodetector while information is being read from the second optical disc 60.

FIG. 10 schematically illustrates how a light beam spot of the light that has been transmitted through the detector hologram 7 with the light shielding area 7x is formed on the photodetector 9 while information is being read from the second optical disc 60 using the optical head 30. Portion (A) of FIG. 10 illustrates how the light beam spot formed by the stray light (1) and (2) looks. A center portion of the stray light (1) and (2) that includes the optical axis of the laser beam at the center is cut off by the light shielding area 7x. As can be seen from the enlarged view shown in portion (B) of FIG. 10, the stray light (1) and (2) never enter the photodetection areas 9a through 9d of the photodetector 9.

On the other hand, the signal beam S2 also has its center portion, including the optical axis of the laser beam, cut off by the light shielding area 7x and condensed as a doughnut-like light beam spot on the photodetection areas 9a through 9d of the photodetector 9.

As shown in portion (B) of FIG. 10, the signal beam S2 and the stray light (1) and (2) never superpose one upon the other on the photodetection areas 9a through 9d of the photodetector 9, thus producing no interference at all. That is to say, the intensity of the signal beam S2 detected does not vary and the servo signals and the information signal can be stabilized.

Likewise, as for the signal beam S1 that has been reflected from a non-target information storage layer of the second optical disc 60, the zero-order diffracted light is also subjected to no less significant convex lens effect by the hologram lens 5 than the stray light(1) and (2). As a result, the center portion of the laser beam is cut off by the light shielding area 7x of the detector hologram 7 and never enters the photodetection areas 9a through 9d of the photodetector 9. In that case, the signal beams S1 and S2 never superpose one upon the other on the photodetection areas 9a through 9d of the photodetector 9, thus producing no interference at all and stabilizing the servo signals and the information signal, too.

As for the stray light (5), (6) and (7), the influence of the interference between the stray light reflected from the surface of the second optical disc 60 and the signal beam S2 may sometimes be more significant than that of the interference between the stray light reflected from the non-target information storage layer of the second optical disc 60 and the signal beam S2. This is because the stray light (5), (6) and (7) include a −first-order diffracted light that should be subjected to even more significant convex lens effect and because the focal points of those stray light on the optical disc become closer to the surface of the optical disc than to the information storage layer. The light shielding area 7x of the detector hologram 7 of this preferred embodiment also prevents the stray light from entering the photodetection areas 9a through 9d of the photodetector 9. Consequently, the signal beam S2 and the stray light (5), (6) and (7) do not superpose one upon the other at all on the photodetection areas 9a through 9d of the photodetector 9.

As described above, by providing the light shielding area 7x, it is possible to reduce the interference between the signal generated by the photodetector when the diffracted light for use to perform a read/write operation is reflected from the target information storage layer and the signal generated by the photodetector when diffracted light of an order not contributing to the read/write operation is reflected from a non-target information storage layer or the surface of the optical disc.

In the preferred embodiment described above, the light shielding area 7x is supposed to be provided on the detector hologram 7. However, the light shielding area does not have to be located on the detector hologram 7. Instead, an optical element that cuts off light as well as the light shielding area may be arranged at any other position along the optical path of the laser beam on the way back toward the photodetector as long as that element is not located along the optical path of the laser beam on the way from the light source toward the storage medium and is away from the photodetector.

It should be noted that Japanese Patent Application Laid-Open Publication No. 2005-141893 discloses a similar optical head that cuts off a center portion of a light beam. According to this document, however, the center portion of the light beam is cut off because only a portion where ±first-order diffracted light, diffracted by an information track on the information storage layer of an optical disc, and a zero-order diffracted light interfere with each other is needed, and the center portion of the light beam including only the zero-order diffracted light is not needed, to detect the tilt of the given optical disc.

According to the present invention, the zero-order diffracted light (detected light) is indispensable to read and/or write information from/on the first and second optical discs 50 and 60. However, since this optical head uses a two-focus lens, the zero-order diffracted light is partially cut off to reduce the stray light that would otherwise enter the photodetector along with the zero-order diffracted light (detected light). Nonetheless, only a portion of that zero-order diffracted light is cut off to minimize the deterioration in the quality of an information signal.

The present invention should be used in an optical head with a two-focus lens and achieves unique effects in reading and/or writing information. That is why the present invention is radically different from the subject matter disclosed in Japanese Patent Application Laid-Open Publication No. 2005-141893 in terms of the environment and aspect in which the present invention is carried out.

Embodiment 2

Figure 11:
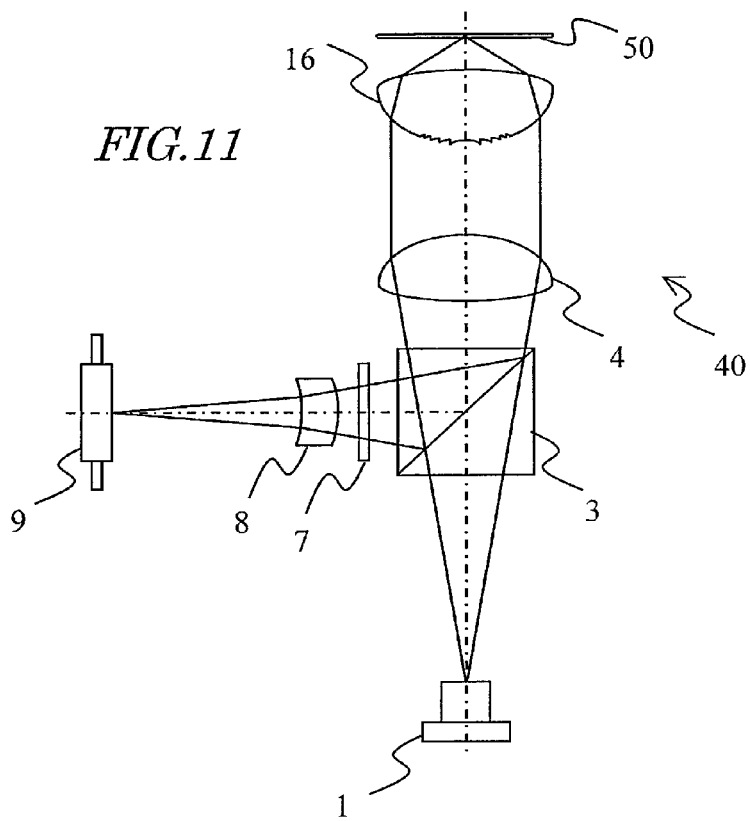
FIG. 11 illustrates a general arrangement for an optical head as a second preferred embodiment of the present invention that is performing a read or write operation on the first optical disc 50.
Figure 12:
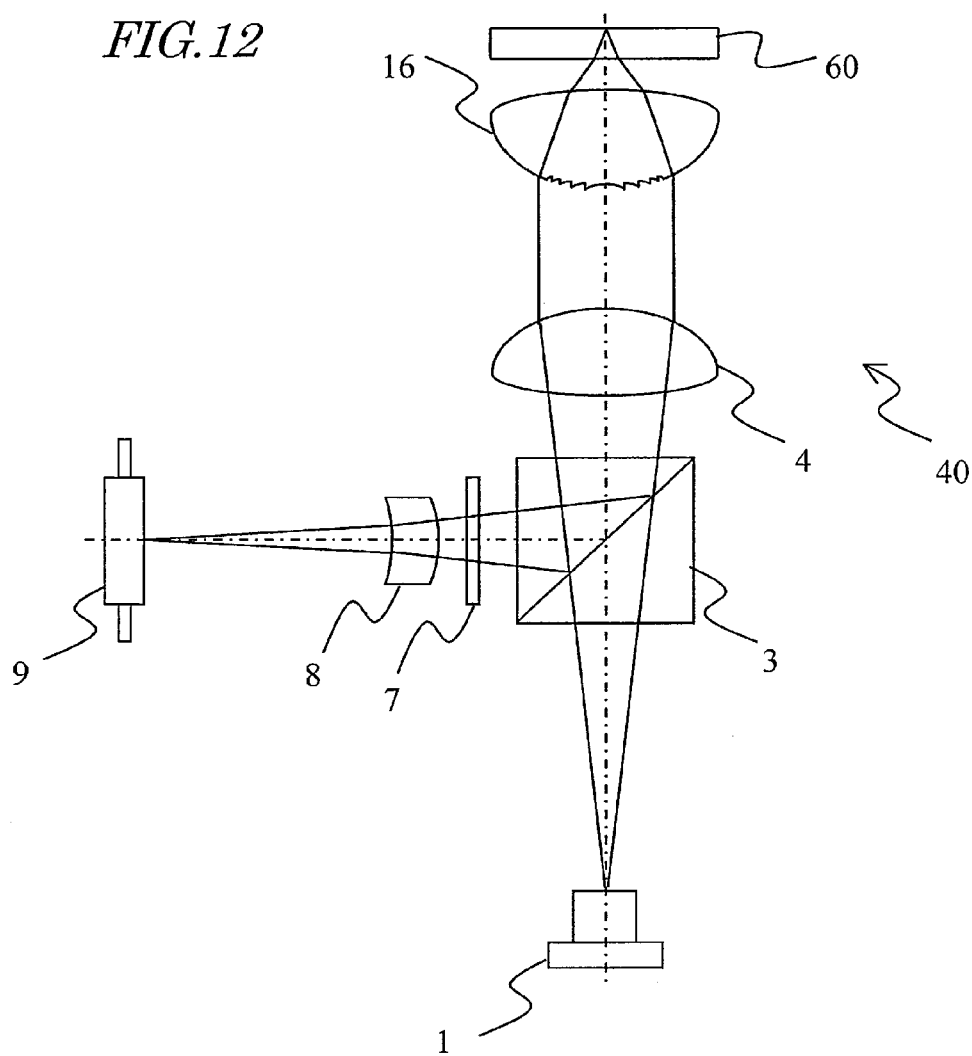
FIG. 12 illustrates a general arrangement for the optical head as the second preferred embodiment of the present invention that is performing a read operation on the second optical disc 60.

FIGS. 11 and 12 illustrate a general arrangement for an optical head 40 according to a second preferred embodiment of the present invention.

In the optical head 40 shown in FIGS. 11 and 12, any member having substantially the same function as the counterpart of the optical head 30 of the first preferred embodiment described above is identified by the same reference numeral and the description thereof will be omitted herein.

As shown in FIGS. 11 and 12, the optical head 40 includes a light source 1 that emits a blue-violet laser beam, a beam splitter 3, a collimator lens 4, an objective lens 16 with hologram, a detector hologram 7, a detector lens 8, and a photodetector 9 to receive the laser beam. As in the first preferred embodiment described above, the first optical disc 50 has a protective substrate with a thickness of approximately 0.1 mm and the second optical disc 60 has a protective substrate with a thickness of approximately 0.6 mm.

The optical head 40 of this preferred embodiment reads and writes information from/on the first optical disc 50 but just reads information from the second optical disc 60. However, the present invention is in no way limited to this specific preferred embodiment of an optical head. Alternatively, the present invention is also applicable to an optical head that can write information on the second optical disc 60, too.

Hereinafter, it will be described with reference to FIG. 11 how the optical head 40 operates in reading or writing information from/on the first optical disc 50. The blue-violet laser beam that has been emitted from the light source 1 is transmitted through the beam splitter 3, transformed into a substantially parallel beam by the collimator lens 4, and then converged by the objective lens 16 with hologram to form a light beam spot on the information storage layer of the first optical disc 50 through the protective substrate. On the way back, the blue-violet laser beam that has been reflected from the information storage layer of the first optical disc 50 is transmitted through the objective lens 16 with hologram and the collimator lens 4 along the same optical path as on the way toward the disc. Thereafter, the blue-violet laser beam is split by the detector hologram 7 to generate servo signals, reflected by the beam splitter 3, given a predetermined astigmatism by the detector lens 8, and then led to the photodetector 9, thereby generating an information signal and the servo signals.

Next, it will be described with reference to FIG. 12 how the optical head 40 operates in reading or writing information from/on the second optical disc 60. The blue-violet laser beam that has been emitted from the light source 1 is transmitted through the beam splitter 3, transformed into a substantially parallel beam by the collimator lens 4, and then diffracted and converged by the objective lens 16 with hologram to form a light beam spot on the information storage layer of the second optical disc 60 through the protective substrate. On the way back, the blue-violet laser beam that has been reflected from the information storage layer of the second optical disc 60 is transmitted through the objective lens 16 with hologram and the collimator lens 4 along the same optical path as on the way toward the disc. Thereafter, the blue-violet laser beam on the way back is reflected by the beam splitter 3, transmitted through the detector hologram 7, given a predetermined astigmatism by the detector lens 8, and then led to the photodetector 9, thereby generating an information signal and servo signals.

The focus error signals for the first and second optical discs 50 and 60 are generated by a so-called "astigmatism" method in which the light beam spot that has been given astigmatism by the detector lens 8 is detected as a quadruple light detection pattern by the photodetector 9.

Also, the tracking error signal for the first optical disc 50 is generated based on the zero-order diffracted light and +first-order diffracted light that have been produced by the detector hologram 7 shown in FIG. 3. On the other hand, the tracking error signal for the second optical disc 60 is generated by a so-called "phase difference detection" method in which the zero-order diffracted light that has been transmitted through the detector hologram 7 is detected as a quadruple light detection pattern in the photodetector 9.

Next, it will be described in detail with reference to FIGS. 13, 14A and 14B how the objective lens 16 with hologram works.

Figure 13:
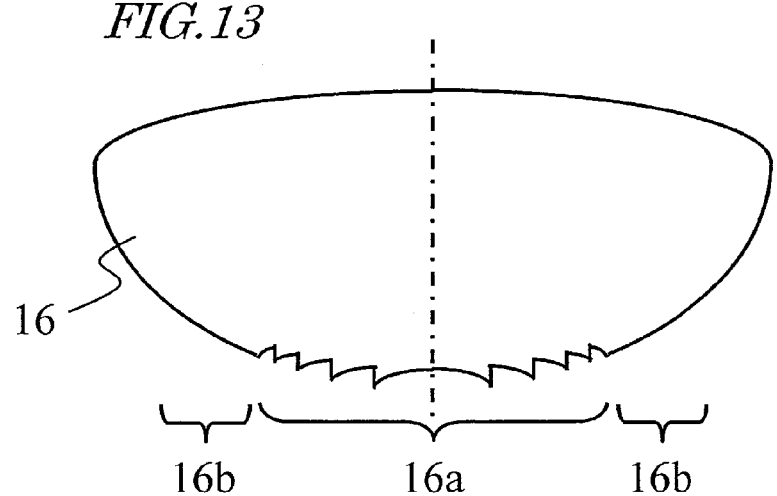
FIG. 13 schematically illustrates the configuration of an objective lens 16 with hologram according to the second preferred embodiment.
Figure 14A:
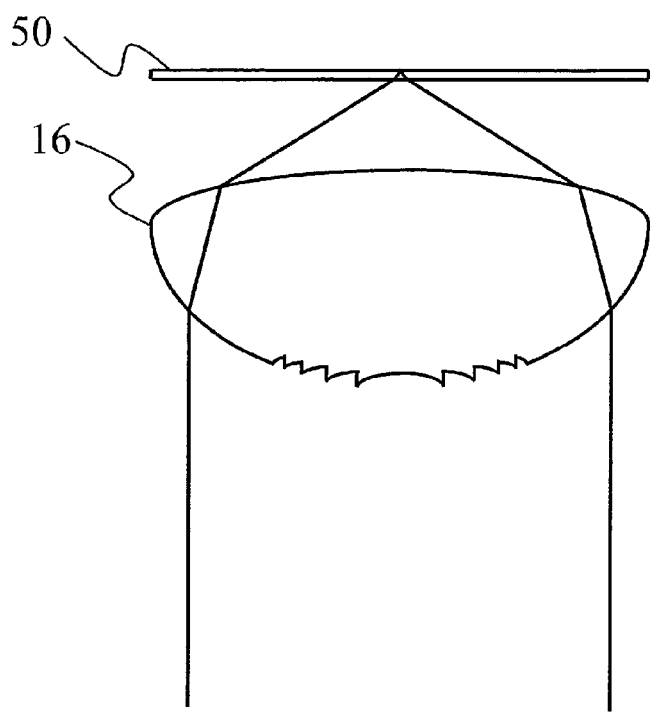
FIG. 14A illustrates how the objective lens 16 with hologram of the second preferred embodiment works on the first optical disc 50.

As shown in FIG. 13, the objective lens 16 with hologram has a concentric grating pattern 16a, of which the center agrees with the optical axis of the objective lens 16 with hologram. Also, the grating pattern 16a is located only within a diameter that is smaller than the aperture defined by the objective lens 16 with hologram. That is why no diffraction occurs at all where the grating pattern 16a is not present.

The objective lens 16 with hologram is designed so as to exhibit a diffraction efficiency of less than 100% with respect to a +first-order diffracted light and to allow even a transmitted light (i.e., zero-order diffracted light) to have a sufficiently high intensity. If the objective lens 16 with hologram has a blaze shape, then the sum of the quantities of the zero- and first-order diffracted light can be increased and the optical efficiency can be improved.

The optical head 40 of this preferred embodiment performs read and write operations on the first optical disc 50 but performs only a read operation on the second optical disc 60. When used for such an optical head, the objective lens 16 with hologram preferably exhibits a diffraction efficiency of 30% or less with respect to the +first-order diffracted light. By setting the diffraction efficiency to such a value, the transmittance of the objective lens 16 with hologram (i.e., the diffraction efficiency of the zero-order diffracted light) can be increased. As a result, higher optical efficiency is achieved on the first optical disc 50 to write information on, and the optical power of the light source can be lowered during the write operation.

On the other hand, when used for an optical head that performs only a read operation on both of the first and second optical discs 50 and 60, the objective lens 16 with hologram preferably exhibits a diffraction efficiency of approximately 30-70% with respect to the +first-order diffracted light. By setting the diffraction efficiency to such a value, information can be read from the first and second optical discs 50 and 60 using approximately equal quantities of light. As a result, the optical power of the light source can be lowered.

If the objective lens 16 with hologram has such a grating pattern as to produce desired +first-order diffracted light, then not only the zero-order diffracted light and the +first-order diffracted light but also −first-order diffracted light, which are conjugate with respect to the +first-order diffracted light, and other higher-order diffracted light are produced. For example, the objective lens 16 with hologram of this preferred embodiment exhibits a diffraction efficiency (i.e., transmission efficiency) of approximately 65% with respect to the zero-order diffracted light, a diffraction efficiency of approximately 15% with respect to the +first-order diffracted light and a diffraction efficiency of approximately 10% with respect to the −first-order diffracted light.

The objective lens 16 with hologram has a numerical aperture (NA) of 0.85. As shown in FIG. 14A, the objective lens 16 with hologram is designed so as to form a light beam spot, which has been converged to the limit of diffraction, on the information storage layer of the first optical disc 50 with a protective substrate thickness of approximately 0.1 mm when the laser beam that has been just transmitted through the objective lens 16 with hologram without being diffracted (i.e., the zero-order diffracted light) is incident on the objective lens 16 with hologram.

Figure 14B:
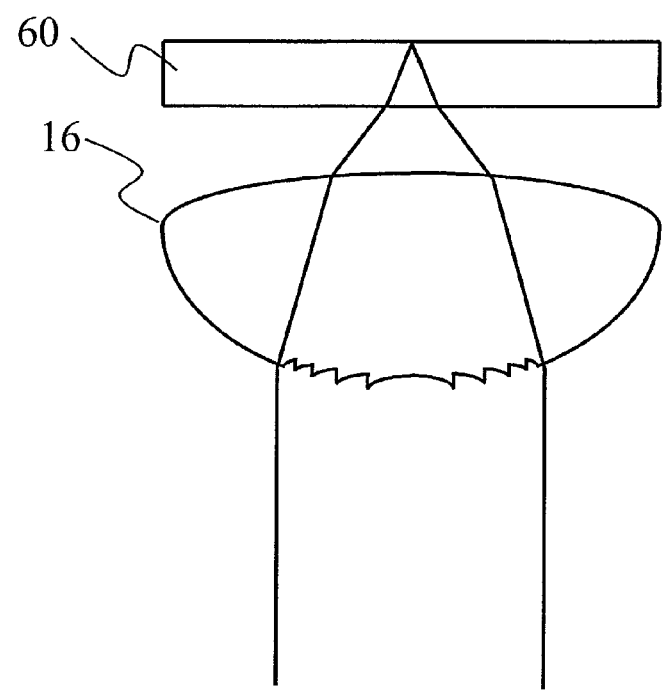
FIG. 14B illustrates how the objective lens 16 with hologram of the second preferred embodiment works on the second optical disc 60.

On the other hand, the +first-order diffracted light that has been diffracted by the objective lens 16 with hologram is converged by the objective lens 16 with hologram on the second optical disc 60 as shown in FIG. 14B. In this case, the +first-order diffracted light has been subjected to aberration correction so as to form a light beam spot, which has been converged to the limit of diffraction, on the information storage layer of the second optical disc 60 with a protective substrate thickness of approximately 0.6 mm.

By using such an objective lens 16 with hologram that diffracts a portion of the incoming light, a two-focus lens that can form a light beam spot, which has been converged to the limit of diffraction, on the information storage layer of multiple optical discs with mutually different protective substrate thicknesses is realized.

The objective lens 16 with hologram of this preferred embodiment has the function of giving more convex lens power to a +first-order diffracted light than to a zero-order diffracted light. That is why the focal point of the +first-order diffracted light with respect to the objective lens 16 with hologram becomes more distant than that of the zero-order diffracted light. Consequently, when the +first-order diffracted light needs to be converged on the information storage layer of the second optical disc 60, which has a thicker protective substrate than the first optical disc 50, a sufficient working distance (WD) can be maintained between the second optical disc 60 and the objective lens 16 with hologram.

As described above, the objective lens 16 with hologram functions as a convex lens with respect to the +first-order diffracted light. For that reason, the focal point of the zero-order diffracted light to read or write information from/on the first optical disc 50 and that of the +first-order diffracted light to read or write information from/on the second optical disc 60 are located at different positions along the optical axis. That is why while information is being read or written using the light beam spot that has been formed at one of these two focal points, the light beam spot formed at the other focal point is defocused and expanded significantly on the information storage layer.

To avoid the interference between the signal beam S2 and the stray light, the detector hologram 7 of this preferred embodiment also includes the light shielding area 7x shown in FIG. 3 as in the optical head 30 of the first preferred embodiment. The light shielding area 7x is a circular area with a diameter D2, which is approximately 10% of the diameter D1 of the light beam used to perform a read/write operation on the first optical disc 50 as indicated by the dashed circle. The light shielding area 7x is defined by depositing a metallic film of aluminum, for example, by an evaporation process and has a transmittance of roughly 0%.

Figure 15:
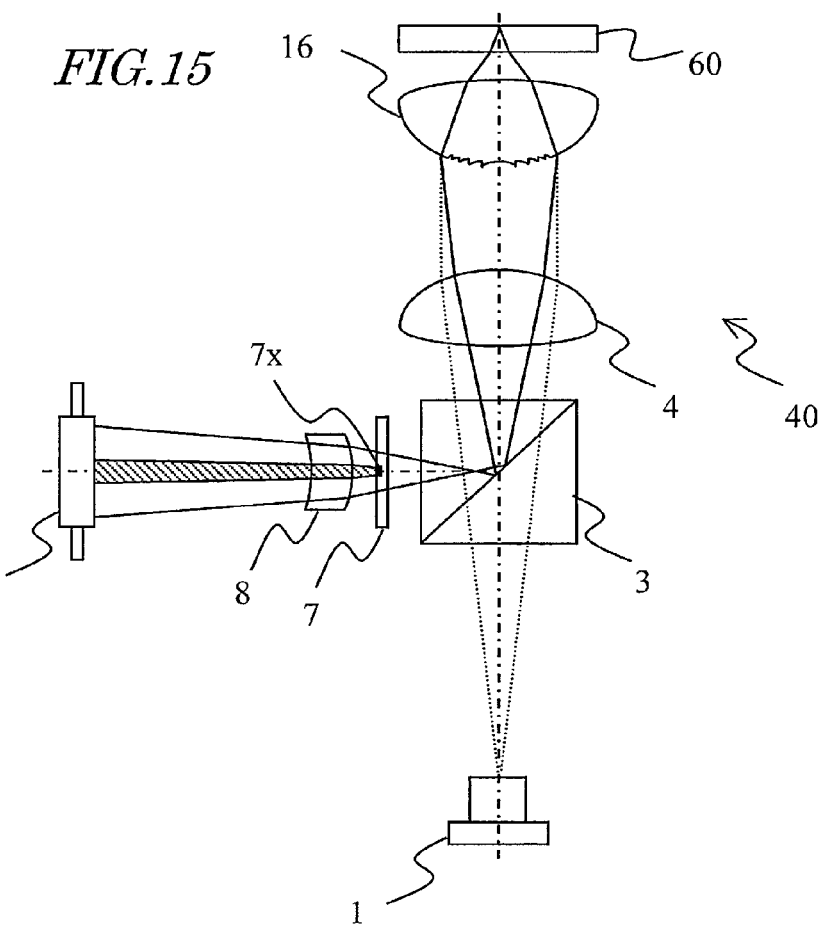
FIG. 15 schematically illustrates the optical path of stray light in the second preferred embodiment while information is being read from the second optical disc 60.

FIG. 15 schematically illustrates the optical paths of laser beams as the stray light (1) and (2) shown in FIG. 8 (which substantially superpose one upon the other at the photodetector 9 after having followed almost the same optical paths) while information is being read from the second optical disc 60 using the optical head 40. The optical paths of the laser beams as the stray light shown in FIG. 15 go back from a different information storage layer from that of the optical path of the laser beam representing the signal beam shown in FIG. 12.

The laser beam reflected from a non-target information storage layer of the second optical disc 60 passes through the objective lens 16 with hologram and the collimator lens 4. Since the zero-order diffracted light is subjected to a great convex lens effect by the objective lens 16 with hologram, the stray light (1) and (2) are condensed before reaching the photodetector 9. For example, in the optical head 40 of this preferred embodiment, the stray light (1) and (2) are once condensed in the beam splitter 3 and then pass through the detector hologram 7 as diverged light. At this point in time, the center portion of the laser beam is cut off by the light shielding area 7x of the detector hologram 7 and then the laser beam is transmitted through the detector lens 8 and led to the photodetector 9.

Thus, in the optical head 40 of this preferred embodiment, a center portion of the stray light (1) and (2) that includes the optical axis of the laser beam at the center is cut off by the light shielding area 7x as shown in portion (A) of FIG. 10. As can be seen from the enlarged view shown in portion (B) of FIG. 10, the stray light (1) and (2) never enter the photodetection areas 9a through 9d of the photodetector 9.

On the other hand, the signal beam S2 also has its center portion, including the optical axis of the laser beam, cut off by the light shielding area 7x and condensed as a doughnut-like light beam spot on the photodetection areas 9a through 9d of the photodetector 9.

As shown in portion (B) of FIG. 10, the signal beam S2 and the stray light (1) and (2) never superpose one upon the other on the photodetection areas 9a through 9d of the photodetector 9, thus producing no interference at all. That is to say, the intensity of the signal beam S2 detected does not vary and the servo signals and the information signal can be stabilized.

Likewise, the signal beam S1 that has been reflected from a non-target information storage layer of the second optical disc 60 and the stray light (5), (6) and (7) reflected from the surface of the second optical disc 60 are also prevented by the light shielding area 7x of the detector hologram 7 from entering the photodetection areas 9a through 9d of the photodetector 9 as in the first preferred embodiment described above. Consequently, the signal beam S2 and the stray light (5), (6) and (7) never superpose one upon the other on the photodetection areas 9a through 9d of the photodetector 9.

In the first and second preferred embodiments described above, the signal beams S1 and S2 are condensed on the photodetector 9 with the center portion of their light beam spot cut off by the light shielding area 7x. In this case, the diameter D2 (see FIG. 3) of the cut-off portion of the first signal beam S1 for use to perform a read/write operation on the first optical disc is approximately 10% of the diameter D1 of the light beam. On the other hand, in the signal beam S2 for use to perform a read/write operation on the second optical disc with a smaller NA, the diameter D2 is approximately 13% of the beam diameter. As long as the cut-off portion accounts for such a small percentage, the detection of servo signals and information signal is hardly affected. That is why there is no need to provide any additional photodetection area for detecting the partially cut-off information signal to avoid deterioration in the quality of the information signal.

Also, in generating a tracking error signal for the first optical disc 50, the area 7g that will define the light shielding area 7x is not used. For that reason, the tracking error signal can be generated based on the +first-order diffracted light with no problem at all.

If the diameter D2 of the light shielding area is further increased with respect to the beam diameter D1 of the laser beam that has been reflected from the second optical disc 60, then the unwanted interference between the signal beams and the stray light can be avoided with more certainty. Nevertheless, if the diameter D2 of the light shielding area were 20% or more of the beam diameter D1, the missing part of the information signal would be too much to avoid significant deterioration of the signal quality.

Figure 16:
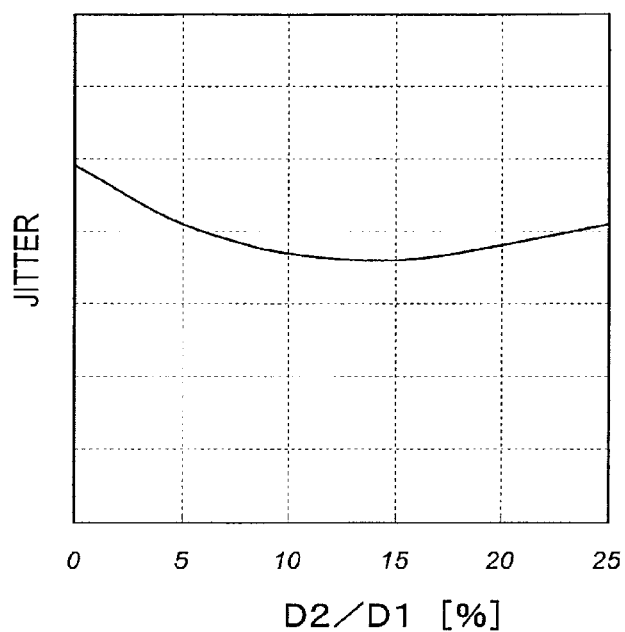
FIG. 16 shows the results of an analysis on the relation between the diameter D2 of the light shielding area and the quality of the information signal.

FIG. 16 shows the results of analysis on the correlation between the diameter D2 of the light shielding area and the quality of the information signal read from the second optical disc 60. In FIG. 16, the abscissa represents the ratio of the diameter D2 of the light shielding area to the beam diameter D1 and the ordinate represents a jitter value, which is an index to the signal quality. The greater the jitter value shown, the more significant the deterioration of the signal quality.

According to the results shown in FIG. 16, as the ratio of the diameter D2 of the light shielding area to the beam diameter D1 increases from 0% (which corresponds to a situation where there is no light shielding area), the jitter value decreases and the signal quality improves. However, when the ratio of the diameter D2 of the light shielding area exceeds 15%, the jitter value starts to increase and the signal quality rather deteriorates.

Therefore, the greater the diameter D2 of the light shielding area, the smaller the degree of interference itself between the signal beams and the stray light. However, to improve the signal quality as much as possible, the ratio of the diameter D2 of the light shielding area to the beam diameter D1 is preferably less than 20% at most, and more preferably is less than 15%.

Figure 17:
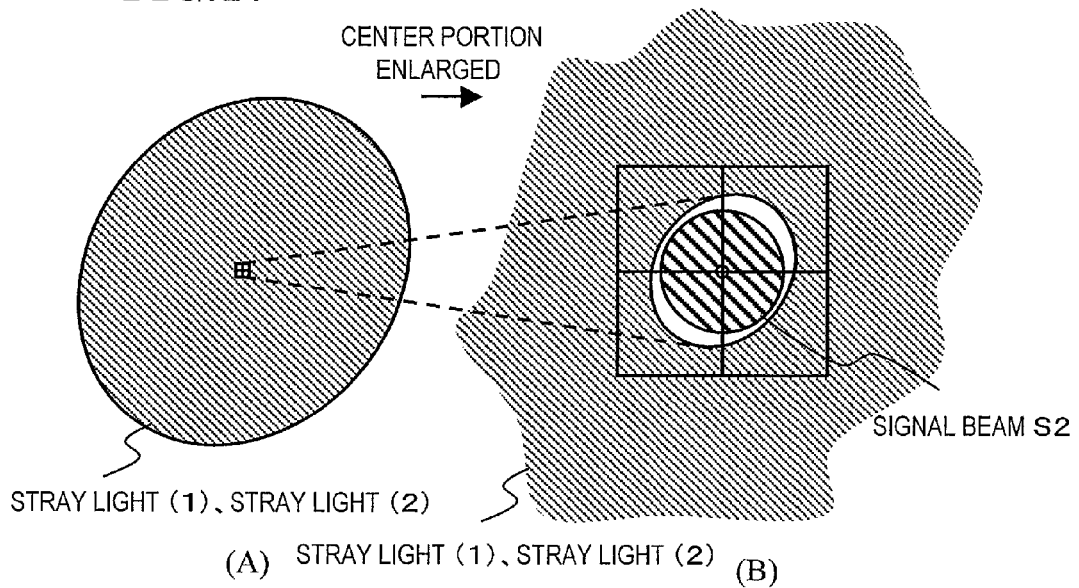
FIG. 17 schematically illustrates how a light beam spot is formed on the photodetector in another circular light shielding area according to the present invention while information is being read from the second optical disc 60.

It should be noted that by using such a circular light shielding area, the interference between the signal beam S2 that is condensed to form a circular light beam spot on the photodetector and the stray light can be avoided with the light shielding area with the smallest possible cross-sectional area as shown in FIG. 17. By adopting such an arrangement, the missing part of the information signal can be minimized and a signal beam of higher quality can be obtained.

Figure 18:
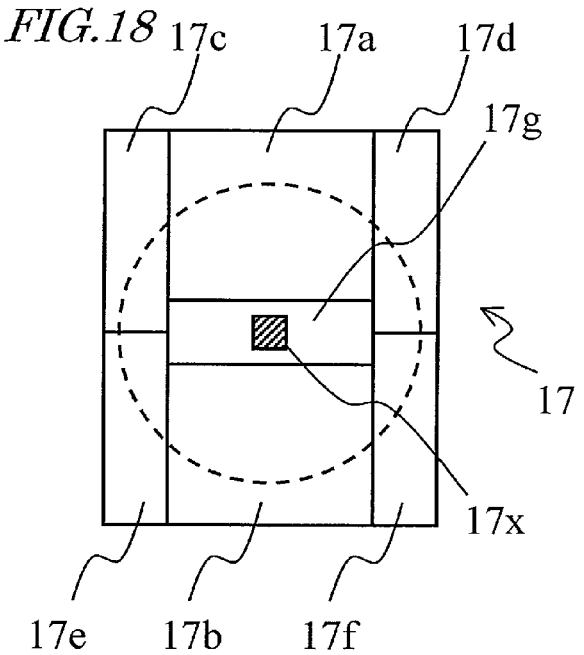
FIG. 18 illustrates the shape of another light shielding area on a detector hologram.
Figure 21:
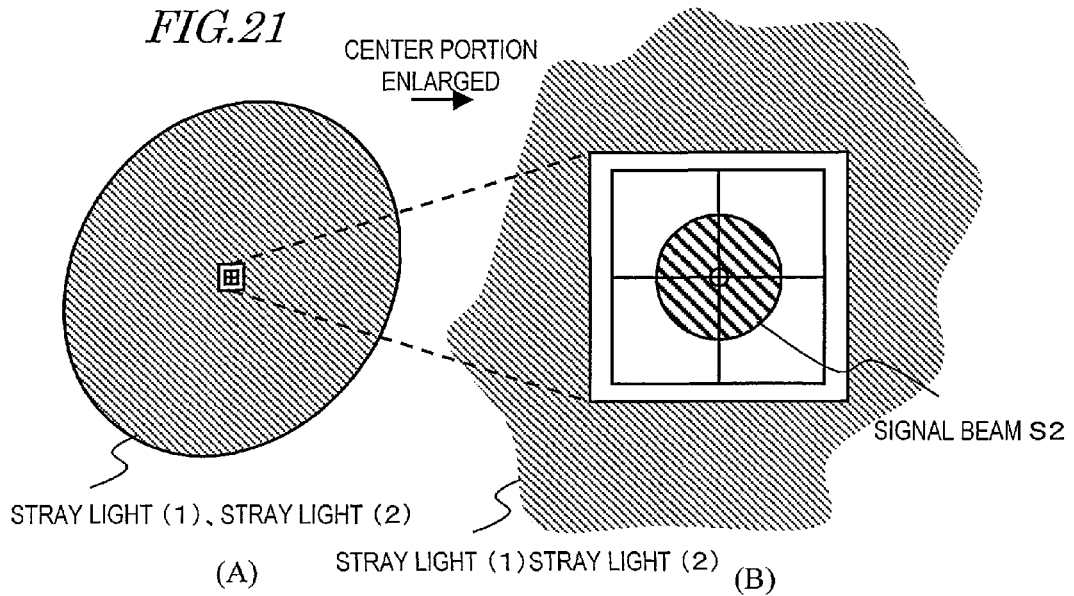
FIG. 21 schematically illustrates how a light beam spot is formed on the photodetector in a substantially parallelogram light shielding area while information is being read from the second optical disc 60.

Nevertheless, the light shielding area does not have to be circular as shown in FIG. 3 but may also be rectangular just like the light shielding area 17x shown in FIG. 18. Even so, the stray light never enter the photodetection areas 9a through 9d of the photodetector 9 as shown in FIG. 19. Still alternatively, if the light shielding area has a substantially parallelogram shape just like the light shielding area 27x shown in FIG. 20, the intrusion of the stray light into the square photodetection areas 9a through 9d can be avoided as shown in FIG. 21. By using such a light shielding area that matches the shape of the photodetection areas in this manner, not just the interference between the signal beam S2 and the stray light but also the intrusion of the stray light into the photodetection areas can be avoided completely. As a result, an information signal and servo signals can be obtained with more stability.

In the first and second preferred embodiments described above, the light shielding area on the detector hologram is supposed to be a metallic film of aluminum, for example, which has been deposited by an evaporation process. However, the light shielding area does not have to have such a structure. Alternatively, the light shielding area may also be provided, on the detector hologram, as a diffraction structure for diffracting the light beam that has been incident on that area to such a direction as to prevent the light beam from being received at a predetermined photodetection area. If the light shielding area is defined by such a diffraction structure, the depth of the diffraction structure is preferably optimized such that the zero-order diffracted light (i.e., transmitted light) becomes approximately equal to zero. The diffraction efficiency with respect to the zero-order diffracted light (or transmitted light) is preferably as close to 0% as possible. However, even if the diffraction efficiency were a matter of several percent (e.g., 10%), substantially the same effects could be achieved. That is why a diffraction efficiency of 10% or less will be referred to herein as a "diffraction efficiency of roughly 0%".

It is also clear that the tracking error signal may be generated not just with the beam splitting pattern shown in FIG. 3 and the pattern on the photodetection areas shown in FIG. 4 but also using a single beam.

Naturally, the same effect will be achieved by providing the light shielding area for the collimator lens, the beam splitter or the detector lens, instead of the detector hologram. Nevertheless, if a portion of the light beam is cut off on the way toward the disc, the light beam spot formed by the objective lens on the information storage layer will be affected. That is why the light shielding area is preferably arranged only along the optical path of the light beam on the way back from the disc. That is to say, the light shielding area is preferably arranged on either a side of the beam splitter or detector lens that transmits only the returning light beam.

Optionally, a light shielding area with a reflectance of roughly 0% may be arranged on a plane that reflects only the returning light beam. In that case, the reflectance is preferably as close to zero as possible. However, substantially the same effects are achieved even if the reflectance is a matter of several percent (e.g., 10%).

In the first and second preferred embodiments described above, the zero-order diffracted light is supposed to be used to perform a read or write operation on the first optical disc 50 and the +first-order diffracted light is supposed to be used to perform a read or write operation on the second optical disc 60. Alternatively, the present invention is also applicable to a situation where the +first-order diffracted light is used to perform a read or write operation on the first optical disc 50 and the zero-order diffracted light is used to perform a read or write operation on the second optical disc 60. Hereinafter, an optical head 30' for reading and writing information from/on the second optical disc 60 with the zero-order diffracted light and for only reading information from the first optical disc 50 with the +first-order diffracted light will be described with reference to FIG. 22.

In the optical head 30', a hologram lens 5' and an objective lens 6' are designed such that when the laser beam that has been just transmitted through the hologram lens 5' without being diffracted (i.e., the zero-order diffracted light) enters the objective lens 6', a light beam spot, which has been converged to the limit of diffraction, can be formed on the information storage layer of the second optical disc 60 with a protective substrate thickness of approximately 0.6 mm. The hologram lens 5' and the objective lens 6' are also designed such that when the +first-order diffracted light that has been diffracted by the hologram lens 5' forms a light beam spot, which has been converged to the limit of diffraction, on the information storage layer of the first optical disc 50 with a protective substrate thickness of approximately 0.1 mm. The grating pattern of the hologram lens 5' covers the entire aperture defined by the objective lens 6'. The grating pattern is designed such that the incoming light beam is converged at different positions inside and outside of the diameter of the light beam for use to perform a read or write operation on the second optical disc 60. With respect to the +first-order diffracted light, for example, the grating pattern is designed so as to exhibit almost equal diffraction efficiencies inside and outside of the beam diameter or to have a slightly higher diffraction efficiency outside than inside of the beam diameter.

Figure 22:
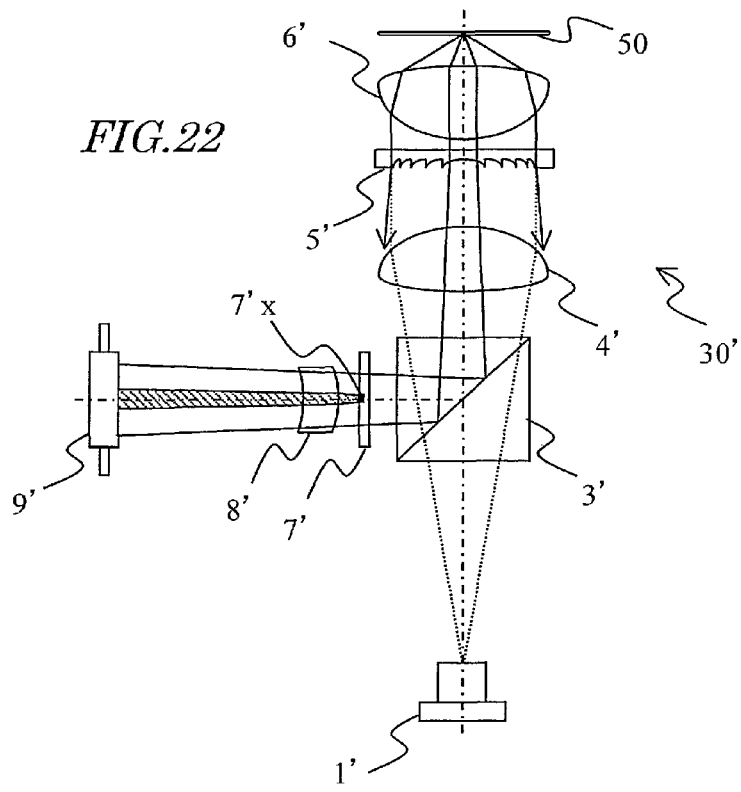
FIG. 22 schematically illustrates the optical path of stray light while information is being read from the first optical disc 50.

FIG. 22 schematically shows the optical paths of stray light when the optical head 30' is reading information from the first optical disc 50. The zero-order diffracted light that has been reflected from a non-target information storage layer of the first optical disc 50 is subjected to a great convex lens effect by the hologram lens 5' and therefore transmitted through the detector hologram 7' as a diverged light. At this point in time, the center portion of the laser beam is cut off by the light shielding area 7'x on the detector hologram 7', and then the laser beam is transmitted through the detector lens 8' and led to the photodetector 9'. It should be noted that FIG. 22 shows only a portion of the zero-order diffracted light that has been reflected from the information storage layer, transmitted through the detector lens 8' and then incident on the photodetector 9'.

A center portion of the stray light, including the optical axis of the laser beam at the center, is cut off by the light shielding area 7'x and the stray light never enter the photodetection areas on the photodetector 9'.

As for the first and second preferred embodiments, a so-called "infinite optical system" optical head, including a collimator lens, has been described. However, the present invention is in no way limited to those specific preferred embodiments. Naturally, the present invention is also applicable to a so-called "finite optical system" optical head including no collimator lenses.

Embodiment 3

Figure 23:
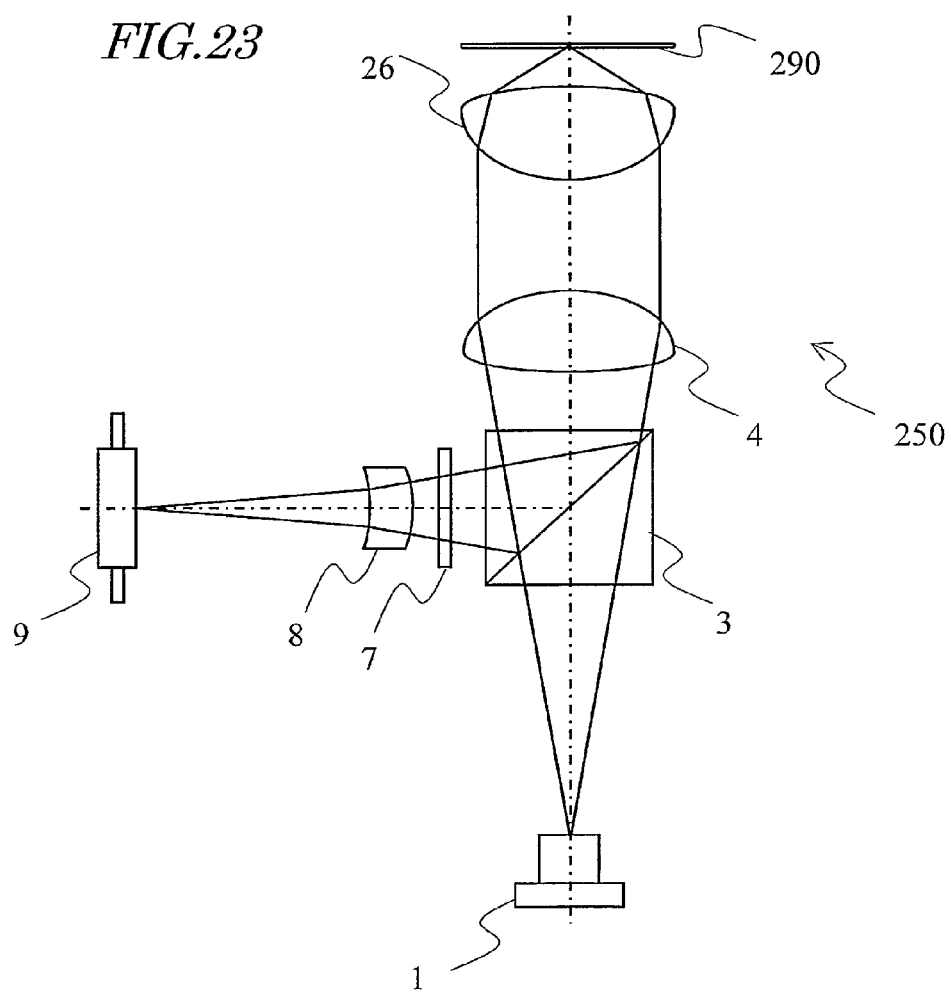
FIG. 23 illustrates a general arrangement for an optical head 50 as a third preferred embodiment of the present invention.

FIG. 23 illustrates a general arrangement for an optical head 250 according to a third preferred embodiment of the present invention.

In the optical head 250 shown in FIG. 23, any member having substantially the same function as the counterpart of the optical head 30 or 40 of the first or second preferred embodiment described above is identified by the same reference numeral and the description thereof will be omitted herein.

As shown in FIG. 23, the optical head 250 includes a light source 1 that emits a blue-violet laser beam, a beam splitter 3, a collimator lens 4, an objective lens 26, a detector hologram 7, a detector lens 8, and a photodetector 9 to receive the laser beam. A third optical disc 290 has three information storage layers. The optical head 250 of this preferred embodiment reads and/or writes information from/on not only the first optical disc 50 already described for the first and second preferred embodiments but also the third optical disc 290.

Hereinafter, it will be described with reference to FIG. 23 how the optical head 250 operates in reading or writing information from/on the third optical disc 290. The blue-violet laser beam that has been emitted from the light source 1 is transmitted through the beam splitter 3, transformed into a substantially parallel beam by the collimator lens 4, and then converged by the objective lens 26 to form a light beam spot on any of the information storage layers of the third optical disc 290 through the protective substrate. On the way back, the blue-violet laser beam that has been reflected from the information storage layer of the third optical disc 290 is transmitted through the objective lens 26 and the collimator lens 4 along the same optical path as on the way toward the disc. Thereafter, the blue-violet laser beam is reflected by the beam splitter 3, split by the detector hologram 7 to generate servo signals, given a predetermined astigmatism by the detector lens 8, and then led to the photodetector 9, thereby generating an information signal and the servo signals.

The focus error signal for the third optical disc 290 is generated by a so-called "astigmatism" method in which the light beam spot that has been given astigmatism by the detector lens 8 is detected as a quadruple light detection pattern by the photodetector 9.

Also, the tracking error signal for the third optical disc 290 is generated based on the zero-order diffracted light and +first-order diffracted light that have been produced by the detector hologram 7 shown in FIG. 3.

The objective lens 26 has a numerical aperture (NA) of 0.85. And the objective lens 26 is designed so as to form a light beam spot, which has been converged to the limit of diffraction, on any of the information storage layers of the third optical disc 290 with a protective substrate thickness of approximately 0.1 mm.

Figure 24:
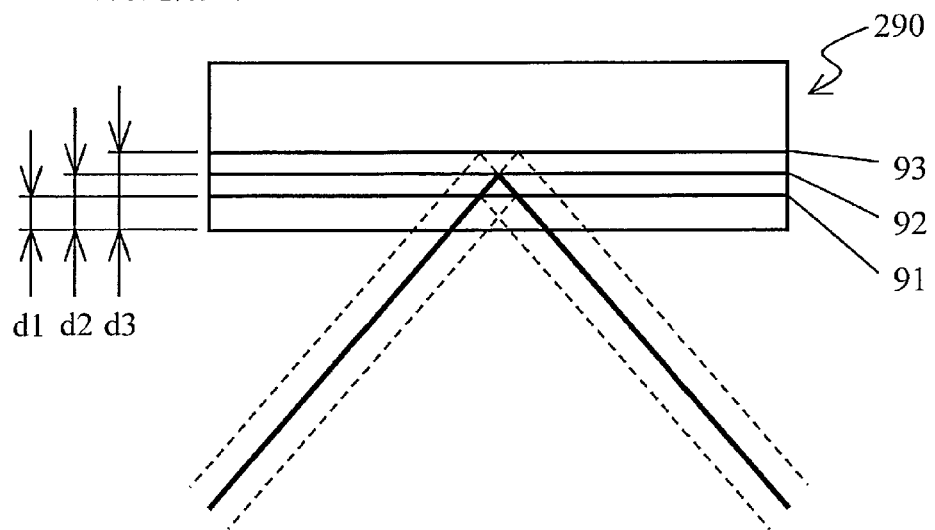
FIG. 24 illustrates the structure of a third optical disc 290 including information storage layers 91, 92 and 93 with mutually different protective substrate thicknesses.

As shown in FIG. 24, the third optical disc 290 includes three information storage layers 91, 92 and 93 with mutually different protective substrate thicknesses. That is why while information is being read or written from/on the information storage layer 92 with a light beam spot formed on that layer 92, the laser beam is also reflected from the other information storage layers 91 and 93. Just like the laser beam reflected from the information storage layer 92, those laser beams are also transmitted through the objective lens 26 and the collimator lens 4, reflected by the beam splitter 3, transmitted through the detector hologram 7 and the detector lens 8, and then led to the photodetector 9. These laser beams reflected from those non-target information storage layers, other than the information storage layer 92, are so-called "stray light".

As in the optical heads 30 and 40 of the first and second preferred embodiments described above, the detector hologram 7 of this preferred embodiment also includes the light shielding area 7x shown in FIG. 3. The light shielding area 7x is a circular area with a diameter D2, which may be defined by depositing a metallic film of aluminum, for example, by an evaporation process and which has a transmittance of roughly 0%.

Figure 25:
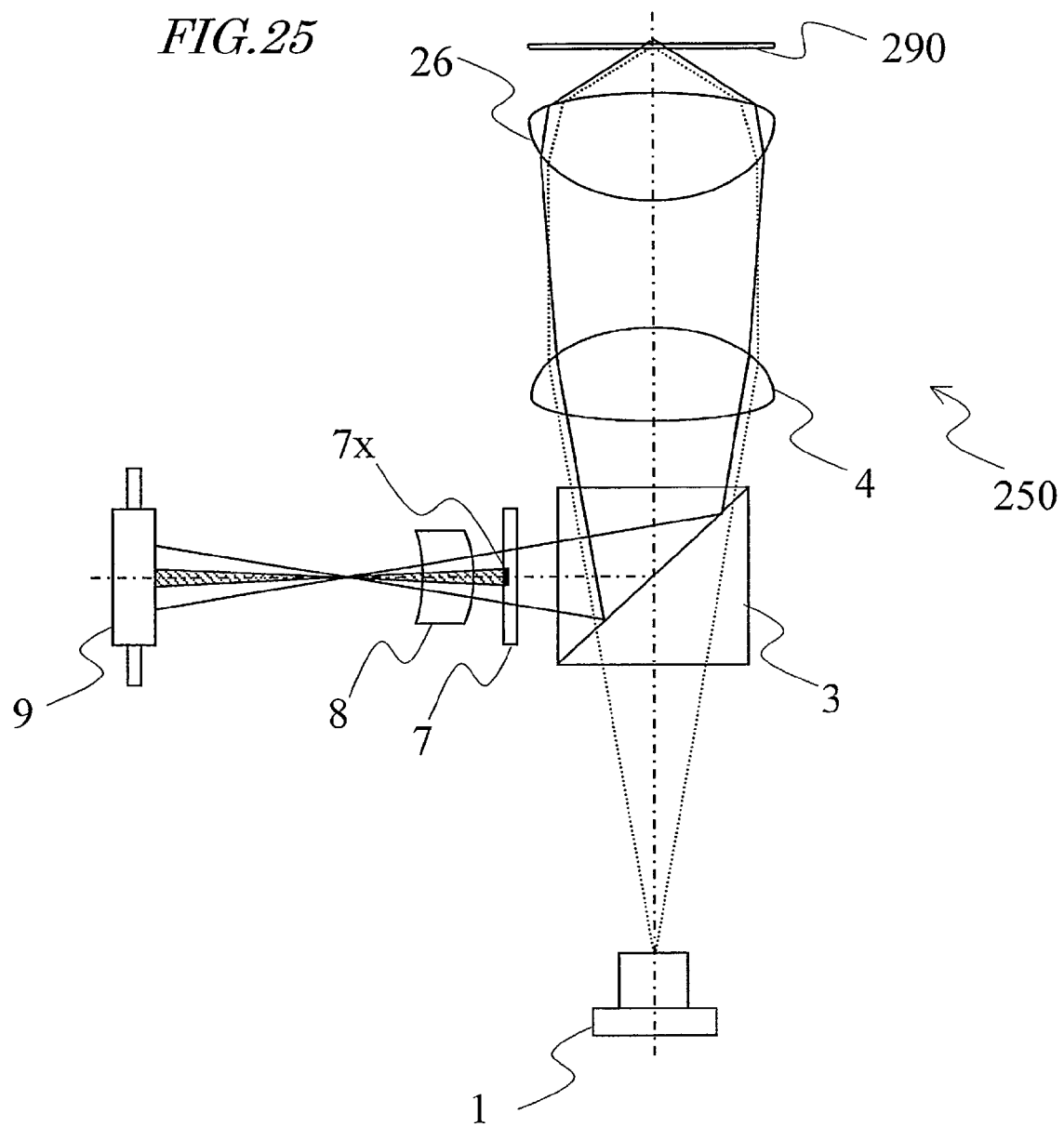
FIG. 25 schematically illustrates the optical path of the light reflected from the information storage layer 91 while the optical head 250 is reading or writing information from/on the information storage layer 92 of the third optical disc 290.

FIG. 25 schematically illustrates the optical path of the light reflected from the information storage layer 91 while the optical head 250 is reading or writing information from/on the information storage layer 92 of the third optical disc 290.

The laser beam that has been reflected from the information storage layer 91 has its center portion cut off by the light shielding area 7x on the detector hologram 7, transmitted through the detector lens 8 and then led to the photodetector 9. The laser beam that has been reflected from the information storage layer 91 has its center portion, including the optical axis of the laser beam at the center, cut off by the light shielding area 7x, and therefore, never enters the photodetection areas on the photodetector 9.

Figure 26:
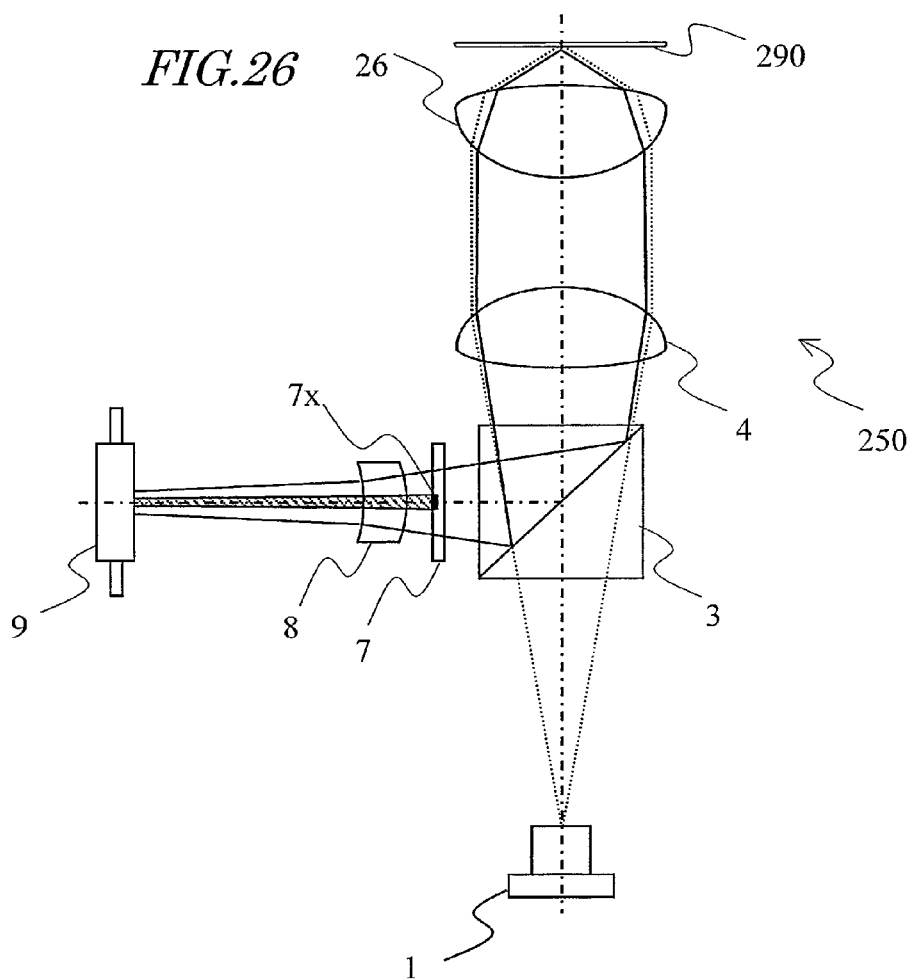
FIG. 26 schematically illustrates the optical path of the light reflected from the information storage layer 93 while the optical head 250 is reading or writing information from/on the information storage layer 92 of the third optical disc 290.

FIG. 26 schematically illustrates the optical path of the light reflected from the information storage layer 93 while the optical head 250 is reading or writing information from/on the information storage layer 92 of the third optical disc 290.

The laser beam that has been reflected from the information storage layer 93 also has its center portion, including the optical axis of the laser beam at the center, cut off by the light shielding area 7x, and therefore, never enters the photodetection areas on the photodetector 9, either.

As described above, the laser beam that has been reflected from the information storage layer 91 or 93 does not enter the photodetection areas on the photodetector 9 and never superposes on the laser beam that has been reflected from the information storage layer 92 to read information from or write information on. As a result, the variation in the detected intensity of the laser beam reflected from the information storage layer 92, which would otherwise be caused by interference, can be minimized and the servo signals and information signal can be stabilized.

Naturally, the same effects are achieved even if the target information storage layer to read information from or write information on is the information storage layer 91 or 93. The same effects are also achieved even when the present invention is applied to an optical disc with four or more information storage layers.

Embodiment 4

Figure 27:
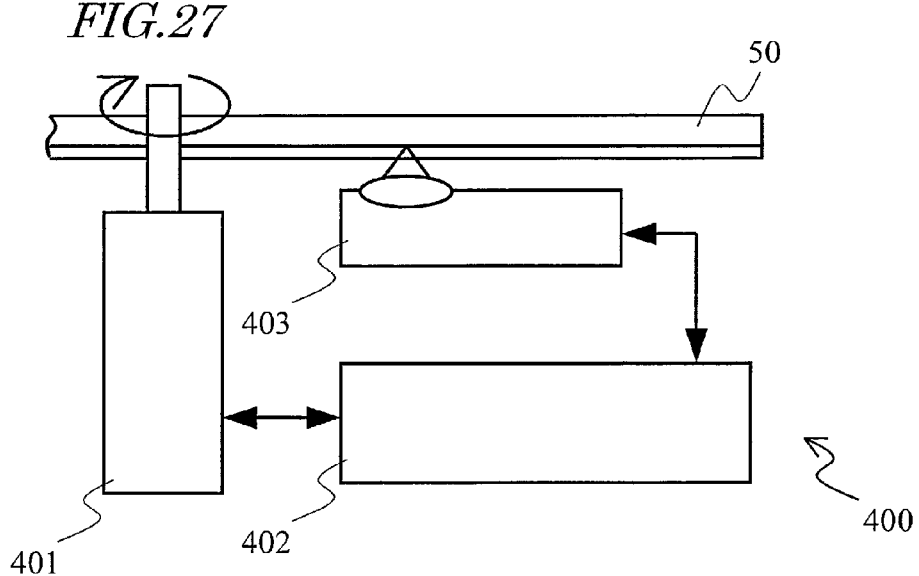
FIG. 27 illustrates a general arrangement for an optical disc drive as a fourth preferred embodiment of the present invention.

FIG. 27 illustrates a general arrangement for an optical disc drive 400 as a fourth preferred embodiment of the present invention.

The optical disc drive 400 includes an optical disc driver section 401, a control section 402, and an optical head 403. Although the first optical disc 50 is shown in FIG. 27, the first optical disc 50 may be replaced with the second optical disc 60 or the third optical disc 290.

The optical disc driver section 401 has the function of rotating and driving the first optical disc 50 (or the second or third optical disc 60 or 290). The optical head 403 may be the optical head of the first, second or third preferred embodiment described above. The control section 402 has the functions of driving and controlling the optical disc driver section 401 and the optical head 403, performing signal processing on the control signal and the information signal generated by the optical head 403, and providing an interface to exchange the information signal between the inside and outside of the optical disc drive 400.

The optical disc drive 400 includes the optical head of the first, second or third preferred embodiment described above. That is why the optical disc drive 400 of this preferred embodiment can perform a read or write operation on multiple optical discs just as intended.

Embodiment 5

Figure 28:
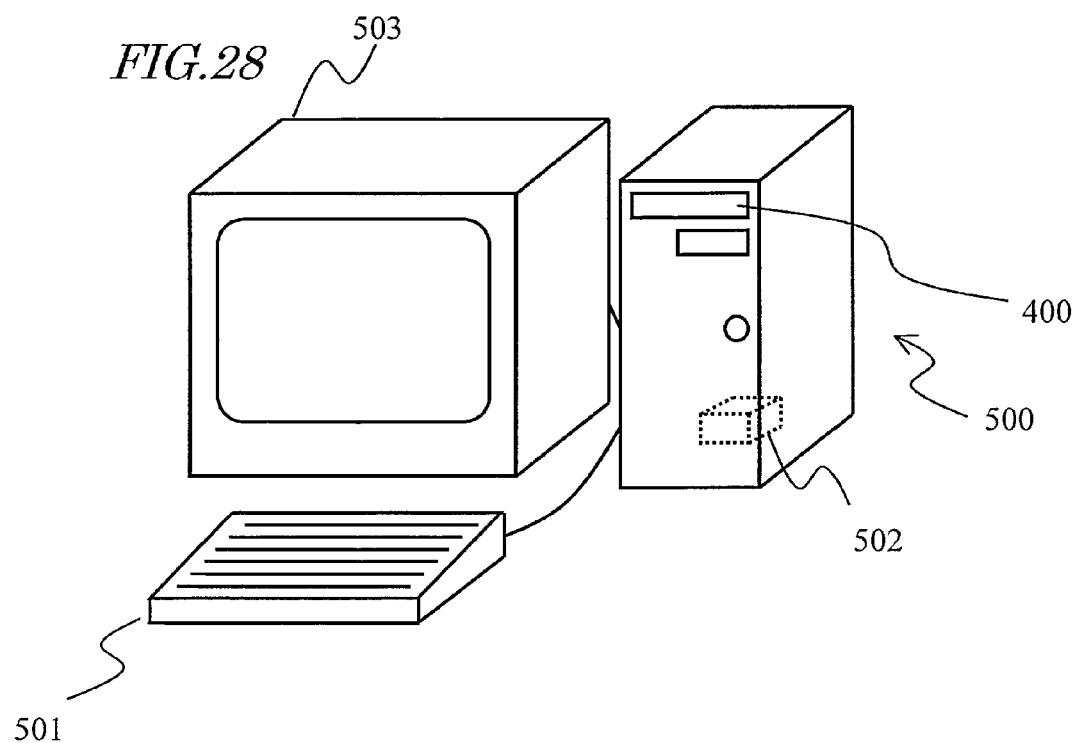
FIG. 28 illustrates a general arrangement for a computer as a fifth preferred embodiment of the present invention.

FIG. 28 illustrates a general arrangement for a computer 500 as a fifth preferred embodiment of the present invention.

The computer 500 includes the optical disc drive 400 of the fourth preferred embodiment just described, an input device 501, a processor 502, and an output device 503.

The input device 501 may be any device for entering information such as a keyboard, a mouse, or a touchscreen panel. The processor 502 is a central processing unit (CPU) that performs computations based on the information entered with the input device 501 and the information retrieved by the optical disc drive 50. The output device 503 is a monitor to display information such as the results of computations performed by the processor 502 and may be a CRT, an LCD or a printer.

The computer 500 includes the optical disc drive 400 of the fourth preferred embodiment and can perform a read or write operation on various types of optical discs just as intended. Thus, this computer 500 can be used in a wide variety of applications.

Embodiment 6

Figure 29:
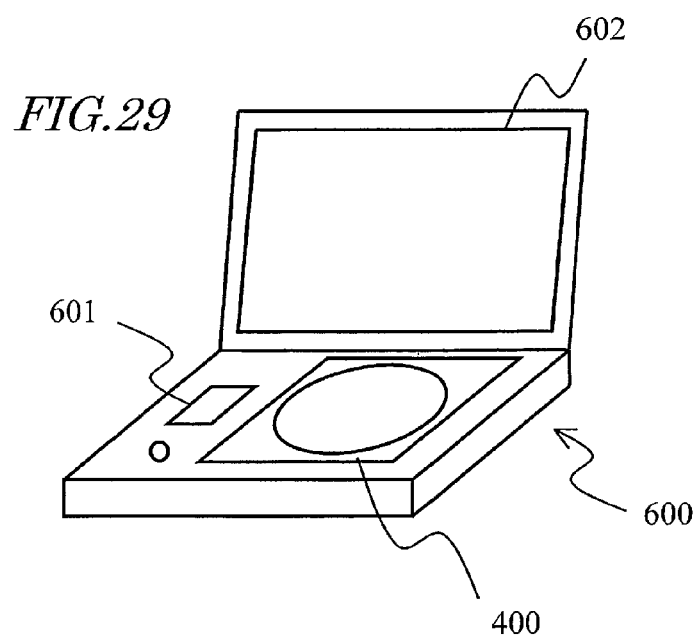
FIG. 29 illustrates a general arrangement for an optical disc player as a sixth preferred embodiment of the present invention.

FIG. 29 illustrates a general arrangement for an optical disc player 600 as a sixth preferred embodiment of the present invention.

The optical disc player 600 includes the optical disc drive 400 of the fourth preferred embodiment described above, a processor 601, and a display device 602.

The processor 601 may be an information-to-image decoder for converting the information signal supplied from the optical disc drive 400 into an image signal. The display device 602 may be an LCD monitor, for example. Optionally, if a location sensor (not shown) that can acquire location information using a GPS, for example, and a central processing unit (CPU) that will be needed to get such processing done are added to the optical disc player 600, the optical disc player 600 may also be used as a car navigation system.

The optical disc player 600 includes the optical disc drive 400 of the fourth preferred embodiment and can perform a read or write operation on various types of optical discs just as intended. Thus, this optical disc player 600 can be used in a broad variety of applications.

Embodiment 7

Figure 30:
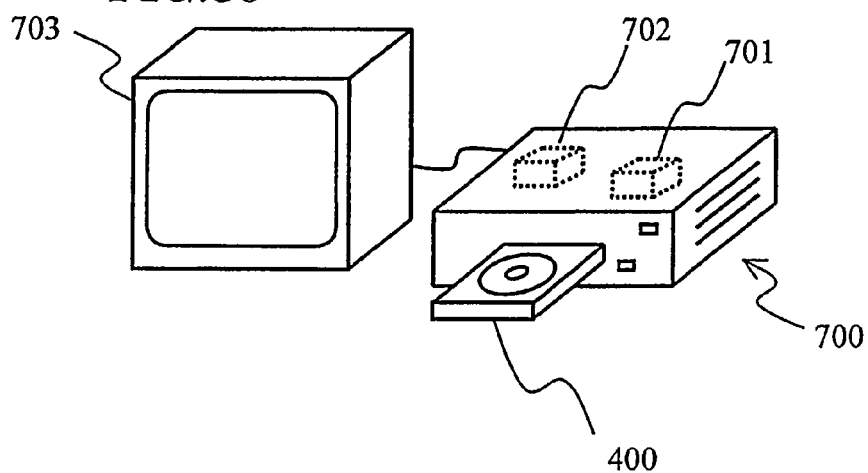
FIG. 30 illustrates a general arrangement for an optical disc recorder as a seventh preferred embodiment of the present invention.
Figure 31:
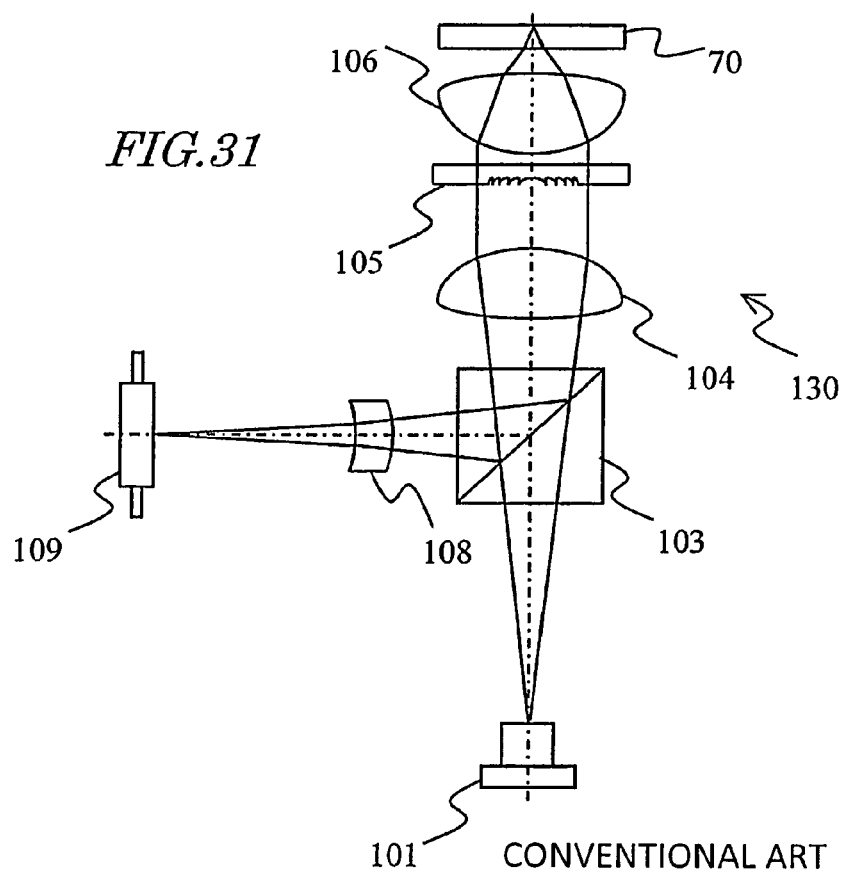
FIG. 31 illustrates a general arrangement for a conventional optical head that is performing a read/write operation on a DVD.
Figure 32:
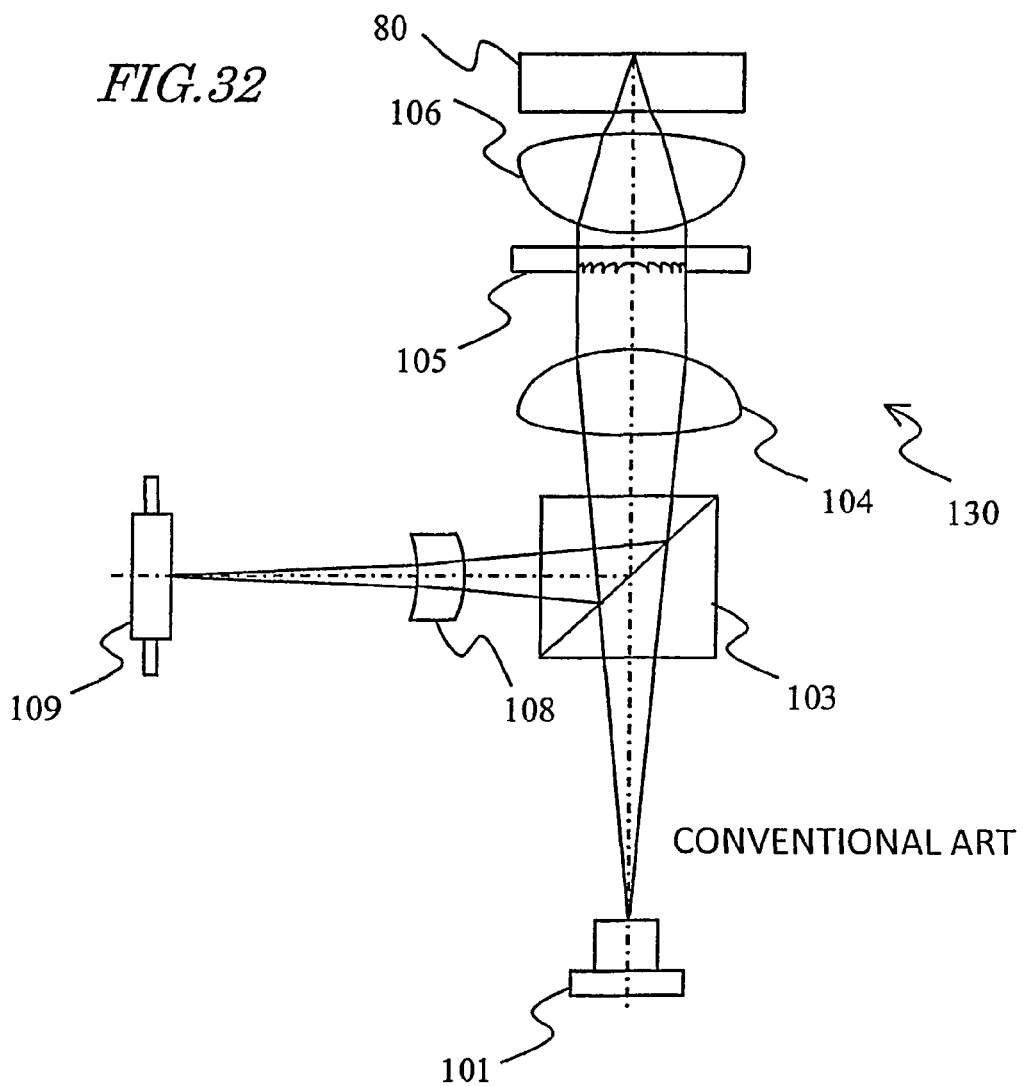
FIG. 32 illustrates an exemplary general arrangement for a conventional optical head.
Figure 33:
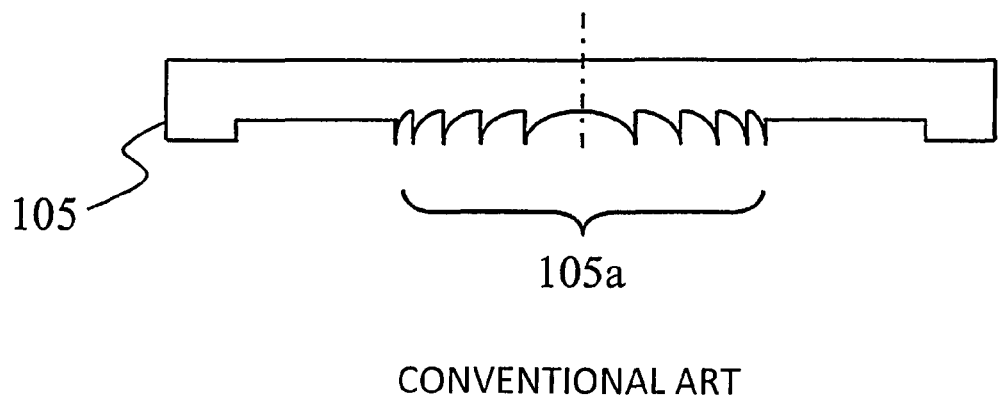
FIG. 33 schematically illustrates the configuration of a hologram lens for a conventional optical head.
Figure 34A:
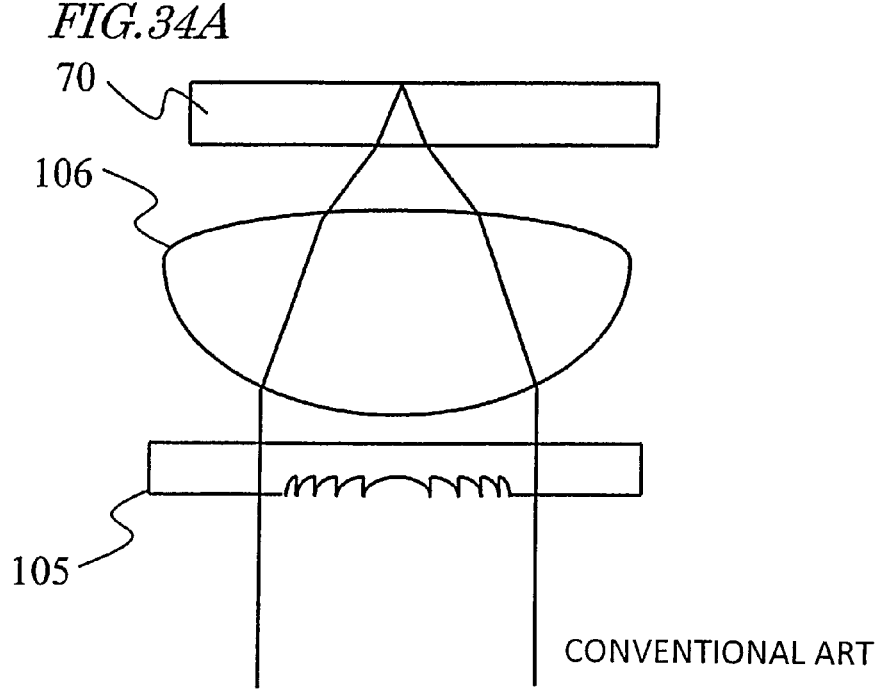
FIG. 34A illustrates how the hologram lens and objective lens of a conventional optical head work on a DVD.
Figure 34B:
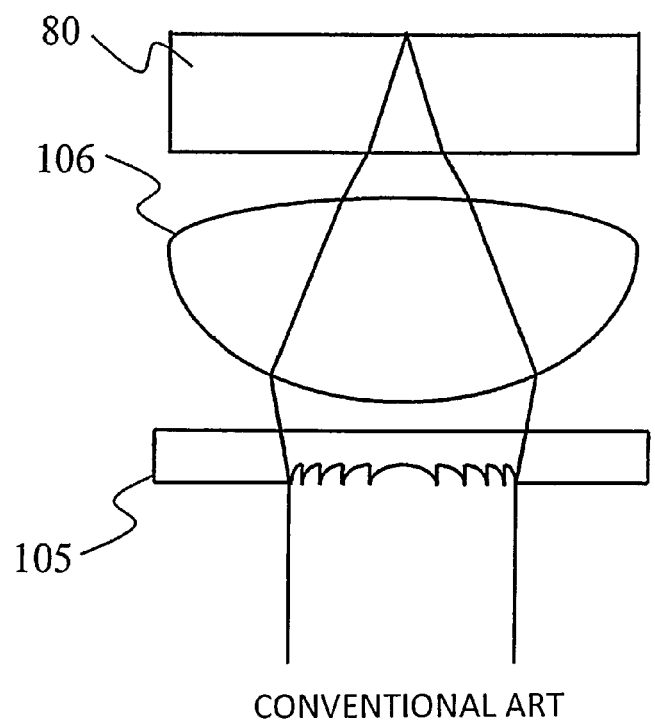
FIG. 34B illustrates how the hologram lens and objective lens of a conventional optical head work on a CD.
Figure 35:
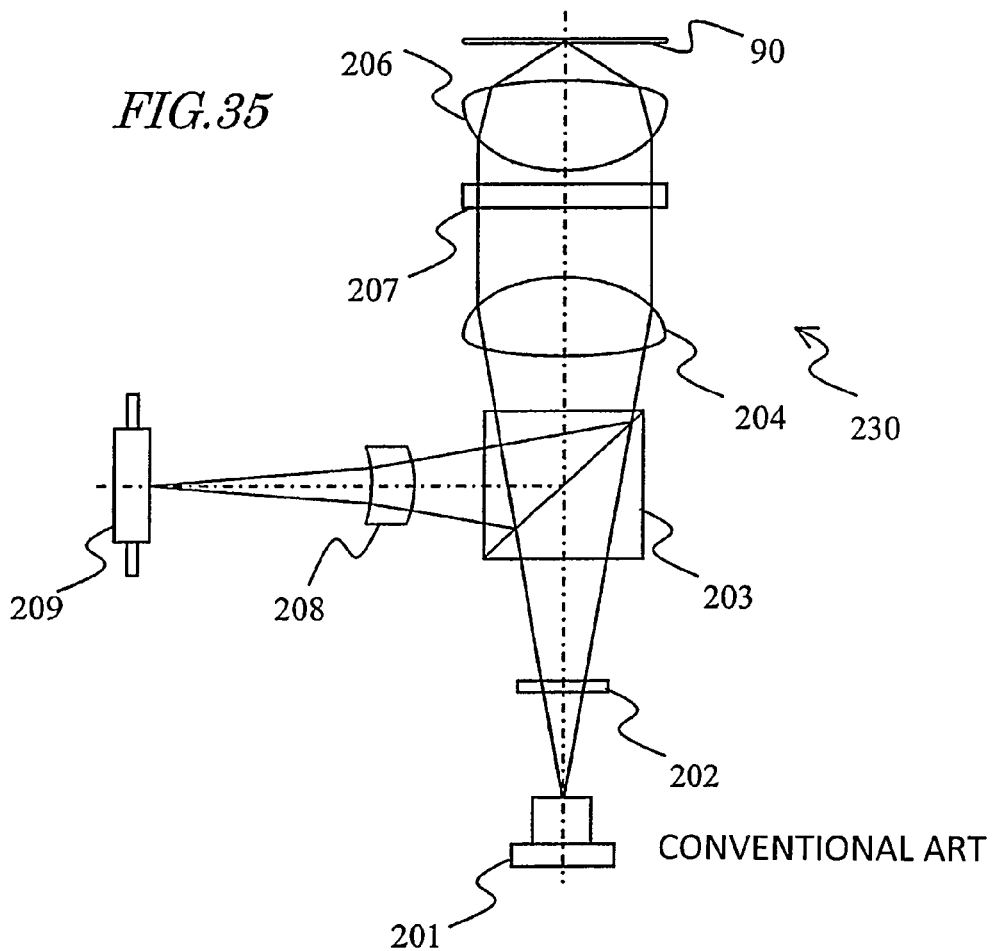
FIG. 35 illustrates an exemplary general arrangement for a conventional optical head.
Figure 36:
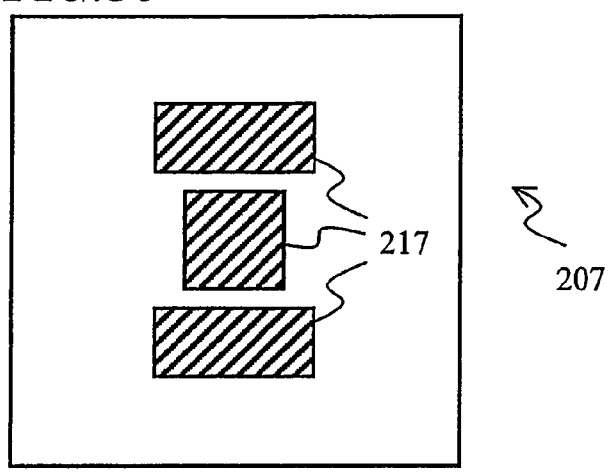
FIG. 36 illustrates the shape of diffracting areas of an optical member in a conventional optical head.

FIG. 30 illustrates a general arrangement for an optical disc recorder 700 as a seventh preferred embodiment of the present invention.

The optical disc recorder 700 includes the optical disc drive 400 of the fourth preferred embodiment described above, an encoder 701 and a decoder 702.

The encoder 701 is an image-to-information converter for converting given image information into an information signal to be written by the optical disc drive 400 on an optical disc. On the other hand, the decoder 702 is an information-to-image converter for converting the information signal supplied from the optical disc drive 400 into image information. As a result, the image stored can be played back. In general, the optical disc recorder 700 preferably includes both the encoder 701 and the decoder 702. However, some optical disc recorder 700 may include only the encoder 701 with no decoder 702.

Optionally, the optical disc recorder 700 may further include an output device 703 for displaying information such as a CRT, an LCD or a printer.

The optical disc recorder 700 includes the optical disc drive 400 of the fourth preferred embodiment and can perform a read or write operation on various types of optical discs just as intended. Thus, this optical disc recorder 700 can be used in a broad variety of applications.

An optical head according to the present invention can perform a read or write operation on various types of optical discs just as intended. Likewise, an optical disc drive according to the present invention and a computer, an optical disc player, and an optical disc recorder including the optical disc drive can also perform a read or write operation on various types of optical discs just as intended. As a result, the optical head, optical disc drive, computer, optical disc player and optical disc recorder of the present invention can be used effectively in a broad variety of applications.

What is claimed is:

1. An optical head for reading and/or writing information from/on a storage medium that has a plurality of information storage layers,
the optical head comprising:
a light source that emits a laser beam;
a collimator lens that is arranged in an optical path of the laser beam on the way toward the storage medium and in an optical path of the laser beam that has been reflected from the storage medium, and that is configured to condense the laser beam that has been reflected from the information storage layer of the storage medium;
an objective lens that converges the laser beam on one of the information storage layers of the storage medium;
a beam dividing element that is arranged in an optical path of the laser beam that has been condensed by the collimator lens, and that is configured to diffract the laser beam to produce at least two parts including a zero-order diffracted light and a first-order diffracted light; and
a photodetector that is arranged to receives the laser beam diffracted by the beam dividing element and to generate a tracking error signal,
wherein the beam dividing element has a transmitting portion and a shielding portion that has a transmittance with respect to the laser beam lower than that of the transmitting portion, the shielding portion being arranged to shield a central portion of the laser beam that has been reflected from the information storage layer of the storage medium.

2. An optical head of claim 1, wherein the transmittance of the shielding portion is 10% or less.

3. An optical head of claim 1, wherein the beam dividing element has a plurality of diffraction areas and diffracts, by the plurality of diffraction areas, the laser beam that has been reflected from the information storage layer of the storage medium.

4. An optical head of claim 3, wherein the photodetector receives the laser beam diffracted by the beam dividing element and detects a tracking error signal.

5. An optical head of claim 1, wherein the beam dividing element has seven diffraction areas and diffracts, by the seven diffraction areas, a laser beam that has been reflected from the information storage layer of the storage medium, and
wherein the photodetector receives the laser beam diffracted by at least six diffraction areas among the seven diffraction areas and detects a tracking error signal.

6. An optical head of claim 5, wherein if non-use area is defined as one of the seven diffraction areas, which receives a portion of the laser beam that has been reflected from the information storage layer of the storage medium, the portion including an optical axis of the laser beam, the area of the shielding portion is smaller than that of the non-use area,
wherein the shielding portion is positioned in the non-use area, and
wherein the photodetector detects the tracking error signal without using the laser beam that has been diffracted by the non-use area.

7. An optical head of claim 1, wherein a shape of the shielding portion is circular.

8. An optical head of claim 1, wherein a shape of the shielding portion is circular and a diameter of the shielding portion falls within the range of 10% to 20% of a beam diameter on the beam dividing element of the light beam that has been reflected from the information storage layer of the storage medium.

9. A beam dividing element for use in an optical head for reading and/or writing information from/on a storage medium that has a plurality of information storage layers,
the optical head comprising:
a light source that emits a laser beam;
a collimator lens that is arranged in an optical path of the laser beam on the way toward the storage medium and in an optical path of the laser beam that has been reflected from the storage medium, and that is configured to condense the laser beam that has been reflected from the information storage layer of the storage medium;
an objective lens that converges the laser beam on one of the information storage layers of the storage medium; and
a photodetector that is arranged to receive the laser beam diffracted by the beam dividing element and to generate a tracking error signal,
wherein the beam dividing element is arranged in an optical path of the laser beam that has been condensed by the collimator lens, is configured to diffract the laser beam to produce at least two parts including a zero-order diffracted light and a first-order diffracted light, and has a transmitting portion and a shielding portion that has a transmittance with respect to the laser beam lower than that of the transmitting portion, the shielding portion being arranged to shield a central portion of the laser beam that has been reflected from the information storage layer of the storage medium.

10. A beam dividing element of claim 9, wherein the beam dividing element has a plurality of diffraction areas and diffracts, by the plurality of diffraction areas, the laser beam that has been reflected from the information storage layer of the storage medium.

11. A beam dividing element of 9, wherein a shape of the shielding portion is circular.

12. A beam dividing element of claim 9, wherein a shape of the shielding portion is circular and a diameter of the shielding portion falls within the range of 10% to 20% of a beam diameter on the beam dividing element of the light beam that has been reflected from the information storage layer of the storage medium.

13. An optical head for reading and/or writing information from/on a storage medium that has a plurality of information storage layers,
the optical head comprising:
a light source that emits a laser beam;
a collimator lens that is arranged in an optical path of the laser beam on the way toward the storage medium and in an optical path of the laser beam that has been reflected from the storage medium, and that is configured to condense the laser beam that has been reflected from the information storage layer of the storage medium;
an objective lens that converges the laser beam on one of the information storage layers of the storage medium;
a beam dividing element that is arranged in an optical path of the laser beam that has been condensed by the collimator lens, and that is configured to diffract the laser beam to produce at least two parts including a zero-order diffracted light and a first-order diffracted light;
a photodetector that is arranged to receive the laser beam diffracted by the beam dividing element and to generate a tracking error signal,
wherein the beam dividing element has a transmitting portion and a shielding portion that has a diffraction efficiency with respect to the zero-order diffracted light lower than that of the transmitting portion, the shielding portion being arranged to shield a central portion of the laser beam that has been reflected from the information storage layer of the storage medium.

14. An optical head of claim 13, wherein a shape of the shielding portion is circular and a diameter of the shielding portion falls within the range of 10% to 20% of a beam diameter on the beam dividing element of the light beam that has been reflected from the information storage layer of the storage medium.

15. A beam dividing element for use in an optical head for reading and/or writing information from/on a storage medium that has a plurality of information storage layers,
the optical head comprising:
a light source that emits a laser beam;
a collimator lens that is arranged in an optical path of the laser beam on the way toward the storage medium and in an optical path of the laser beam that has been reflected from the storage medium, and that is configured to condense the laser beam that has been reflected from the information storage layer of the storage medium;
an objective lens that converges the laser beam on one of the information storage layers of the storage medium; and
a photodetector that is arranged to receive the laser beam diffracted by the beam dividing element and to generate a tracking error signal,
wherein the beam dividing element is arranged in an optical path of the laser beam that has been condensed by the collimator lens, is configured to diffract the laser beam to produce at least two parts including a zero-order diffracted light and a first-order diffracted light, and has a transmitting portion and a shielding portion that has a diffraction efficiency with respect to the zero-order diffracted light lower than that of the transmitting portion, the shielding portion being arranged to shield a central portion of the laser beam that has been reflected from the information storage layer of the storage medium.

16. A beam dividing element of claim 15, wherein a shape of the shielding portion is circular and a diameter of the shielding portion falls within the range of 10% to 20% of a beam diameter on the beam dividing element of the light beam that has been reflected from the information storage layer of the storage medium.

* * * * *